(12) United States Patent
Bethlehem et al.

(10) Patent No.: US 7,912,822 B2
(45) Date of Patent: Mar. 22, 2011

(54) SYSTEM AND METHOD FOR LAUNCHING A RESOURCE IN A NETWORK

(75) Inventors: Alex Bethlehem, Calgary (CA); Laura Armstrong, Calgary (CA); Yan Chen, Calgary (CA); Zhenwu Li, Calgary (CA); Paul Zhiyong Zhou, Calgary (CA)

(73) Assignee: desktopsites Inc., Calgary (CA)

( * ) Notice: Subject to any disclaimer, the term of this patent is extended or adjusted under 35 U.S.C. 154(b) by 266 days.

(21) Appl. No.: 11/291,913

(22) Filed: Dec. 2, 2005

(65) Prior Publication Data

US 2006/0168136 A1 Jul. 27, 2006

Related U.S. Application Data

(63) Continuation-in-part of application No. 11/001,127, filed on Dec. 2, 2004.

(51) Int. Cl.
G06F 7/00 (2006.01)
G06F 17/30 (2006.01)

(52) U.S. Cl. ........................................ 707/705; 783/785
(58) Field of Classification Search ........................ None
See application file for complete search history.

(56) References Cited

U.S. PATENT DOCUMENTS

| | | | |
|---|---|---|---|
| 6,009,175 A | 12/1999 | Schanze | |
| 6,041,360 A | 3/2000 | Himmel et al. | |
| 6,052,710 A * | 4/2000 | Saliba et al. | 709/203 |
| 6,058,423 A * | 5/2000 | Factor | 709/226 |
| 6,091,409 A | 7/2000 | Dickman et al. | |
| 6,101,508 A | 8/2000 | Wolff | |
| 6,101,537 A | 8/2000 | Edelstein et al. | |
| 6,161,139 A * | 12/2000 | Win et al. | 709/225 |
| 6,182,142 B1 * | 1/2001 | Win et al. | 709/229 |
| 6,360,232 B1 | 3/2002 | Brewer et al. | |
| 6,360,262 B1 | 3/2002 | Guenthner et al. | |

(Continued)

FOREIGN PATENT DOCUMENTS

| | | |
|---|---|---|
| EP | 1 381 190 | 1/2004 |
| WO | WO 00/54151 | 9/2000 |
| WO | WO 01/33381 | 5/2001 |

OTHER PUBLICATIONS

Papastavrou, S. et al., "Mobile Agents for World Wide Web Distributed Database Access", IEEE Transactions on Knowledge and Data Engineering, vol. 12, No. 5, Sep.-Oct. 2000, pp. 802-820.

(Continued)

*Primary Examiner* — Khanh B Pham
*Assistant Examiner* — Azam Cheema
(74) *Attorney, Agent, or Firm* — McCarthy Tétrault LLP

(57) ABSTRACT

The invention provides a system and method for a client connected to a server in a computer network to access a resource, such as an application, database (either local, server, or web-based), service and/or a file, stored in the network. The system comprises: the client in the network; the server in the network; an instance of the resource stored in at least one of the server and the client; a file associated with the application stored in at least one of the server and the client; and an access module operating to provide the client with access to the server. In the system at the client, a first icon associated with a said resource is provided and if the instance of the resource is stored at the server, the application is automatically accessed when the icon at the client is activated.

16 Claims, 24 Drawing Sheets

U.S. PATENT DOCUMENTS

| | | | |
|---|---|---|---|
| 6,754,696 B1* | 6/2004 | Kamath et al. | 709/213 |
| 7,526,410 B2* | 4/2009 | Anastassopoulos et al. | 702/186 |
| 2002/0112048 A1 | 8/2002 | Gruyer et al. | |
| 2003/0009476 A1 | 1/2003 | Fomenko et al. | |
| 2003/0156119 A1 | 8/2003 | Bonadio | |
| 2003/0195950 A1 | 10/2003 | Huang et al. | |
| 2004/0167984 A1* | 8/2004 | Herrmann | 709/229 |
| 2004/0199639 A1 | 10/2004 | Harris | |
| 2004/0255289 A1 | 12/2004 | George et al. | |
| 2004/0261025 A1* | 12/2004 | Rizk et al. | 715/530 |
| 2004/0268364 A1* | 12/2004 | Faraj | 719/316 |
| 2005/0066284 A1* | 3/2005 | Ho et al. | 715/762 |

OTHER PUBLICATIONS

Klemm, R.P., "Web Companion: A Friendly Client-Side Web Prefetching Agent", IEEE Transactions on Knowledge and Data Engineering, vol. 11, No. 4, Jul.-Aug. 1999, pp. 577-594.

Bouguettaya, A., "Supporting Dynamic Interactions Among Web-Based Information Sources", IEEE Transactions on Knowledge and Data Engineering, vol. 12, No. 5, Sep.-Oct. 2000, pp. 779-801.

Gavron, Jacquelyn and Joseph Moran. How to Use Microsoft Windows NT 4 Workstation. Emeryville, CA. 1996. p. 73.

* cited by examiner

Secure Gateway / Hosted Server Based Applications – Network Flow

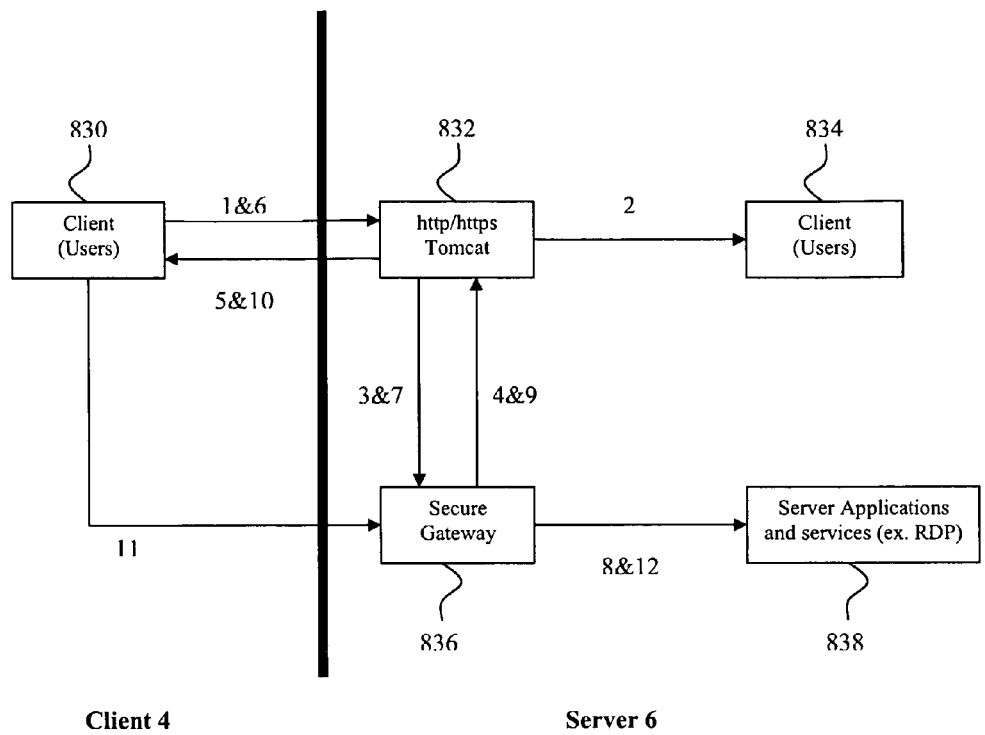

Fig. 8C

1. Client logs in
2. Authenticate client in Active Directory
3. Authentication passed, FE/BE interface sends client IP, user id to Port Knocking Service
4. Port Knocking service generates the port sequence/key for the client and sends key back to FE/BE interface
5. The backend sends the port sequence/key to client
6. Client launches the application/service, sends client IP, user id and program to FE/BE interface
7. FE/BE interface sends all the information to the Port Knocking Service
8. Port Knocking Service queries the load balancer and gets the proper terminal server IP address
9. Port Knocking service sends terminal server IP address to FE/BE interface, which then creates work dir
10. FE/BE interface sends terminal server IP address to client
11. Client executes port/key knocking
12. If the port/key knocking is successful, the port knocking service will connect the selected terminal server and relay the connection from client.

Drive Mapping / Setup Shared data, folders, and files - Process Flow

Publish Shared Server(s) And PC's - Process View

Profile Synchronization on Multi Servers - Process Flow

Launching Web Based Applications and Services - Process Flow

SYSTEM AND METHOD FOR LAUNCHING A RESOURCE IN A NETWORK

RELATED APPLICATION

This application is a continuation-in-part application of U.S. patent application Ser. No. 11/001,127 filed Dec. 2, 2004.

FIELD OF THE INVENTION

The invention relates to a system and method for launching or accessing a resource in a computer network, in particular, a system and method of extending network resources for in and out of the workplace access.

BACKGROUND

Advantages of the Internet as an economical communications medium are driving companies to use it to deliver business critical applications and network data resources, enabling customers, partners, remote offices and mobile employees to work together and collaborate more efficiently.

However, a fundamental challenge facing organizations today is managing the increasing rate of required changes while maintaining business continuity. The process of building, deploying, integrating applications and melding with packaged applications and third-party data streams is becoming increasingly difficult. Today many enterprises approach migration with a growing series of uncoordinated tools to repeatedly build, rebuild, and update operating systems and several other tools for ongoing management. Web-based applications and data provide a key company resource in today's business environment. Legacy applications are a mix of mainframe and pure client/server applications.

In order to consider application redevelopments for the Web, this typically entails a long-term effort, requires significant capital expenditure and frequently results in losing the rich client functionality necessary in business-critical applications to enhance productivity.

Terminal-based or centralized hosting environments in which multiple terminals connect to a host computer (i.e. server based computing), applications and data are typically deployed, managed and supported on the server with solutions offering delivery and management over the Internet. The principle advantages of this form of deployment are reduced maintenance and support for client terminals, a standardized corporate client terminal and centralized resource management. However, for organizations with multiple locations and numerous users, the costs associated with traditional emulation software can be excessive due to costly individual licensing costs, maintenance, support and updates. Further web-based computing protocols within a server based computing model could be very sensitive to network delay, consuming a constant amount of unnecessary bandwidth, in addition to utilizing significant server resources for each user session. Another system is virtual private networks (VPN), which allow enterprises to carve secure and reliable "networks" out of the public Internet infrastructure. However, the very nature of a remote access VPN, being to provide secure access to distributed users at numerous remote locations, introduces deployment and maintenance concerns. VPNs are unable to deliver instant and continuous connectivity and are processor-intensive and bandwidth-heavy in use. Another drawback of VPNs is that a VPN client must be installed and maintained on every PC that requires access and each individual PC user must be trained to operate the VPN application. This configuration leads to source data, which often resides on laptop PCs or other devices, being left vulnerable to loss or theft. Once connected via a VPN the remote PC is granted full rights and privileges to roam the corporate network, which may be exploited by hackers using a remote VPN connection to gain access to corporate network resources.

There is a need for a system and method for providing access within the corporate environment, remote or mobile access to applications and data, which addresses deficiencies in the prior art.

SUMMARY OF THE INVENTION

In a first aspect, an access system controlling access of a client to resource, such as an application, database (either local, server, or web-based), service, data and/or a file, located within a network having a server and the client is provided. The system comprises: a client data interface defining data interfaces, data transmission rule sets, methods, and scripts associated with the client; a user profile associated with the client storing the data interfaces, the data transmission rule sets, the methods and the scripts; a server communicator controlling distribution of the user profile within the network; and an access module providing a bi-directional view of the application and the file between the server and the client. In the system, the client can selectively choose to search for the application from one of first searching for the application on the server and first searching for the application on the client. In the system, client interfaces (such as GUIs) may include and are not limited to: a desktop launcher, server desktop, client desktop, or a portal, and/or a combination thereof.

In the system, the administrative interface may comprise a configuration management user interface on the client to define logical data interfaces, data transmission rule sets, methods, and scripts.

In the system, the logical export and import data interface may comprise export and import data connections, import and export data views and the import and export data bags.

In the system, the logical import data interface may import data from an import data source into the system.

In the system, the import data may be used during execution of the server communicator to load data from then import data source into then import data bags.

In the system, the logical export data interface may be used to export data from an export data source into an export data target client of the user profile delivery system.

In the system, an export data view of the export data bag may be used during execution of the server communicator to load data from then export data bag out to then export data target.

In the system, the server communicator may execute defined scripts stored in then user profile data.

In the system, the rule processor may be invoked by the server communicator to execute the user's requests and responses using either or both the import and export data bags based on data transmission rules.

In the system, the server communicator language may comprise a set of server communicator commands and a server communicator processor to process and execute each server communicator command lines.

In the system, the communicator commands may comprise: a load command; a display command for displaying data from a data bag into the export data target; a format command for formatting a data bag into a user display using a defined rule set; a execute command for executing a data bag from a user's request; and a save command for saving data from a client to an import data connection at the server.

In a second aspect, an access system for a client connected to a server in a computer network to resource, such as an application, database (either local, server, or web-based), service and/or a file, stored in the network is provided. The system comprises: the client in the network; the server in the network; an instance of the application stored in at least one of the server and the client; a file associated with the application stored in at least one of the server and the client; and an access module operating to provide the client with access to the server. In the system at the client, a first icon of the file/data is provided and if the instance of the application is stored at the server, the application/service is automatically accessed when the icon at the client is activated.

In the system, when the application/service is not stored on the client, the icon may have attributes associated a location of the application/service.

In the system, the client may be provided with an option of searching for the instance of the application on either the client first or the server first.

In the system, user profile data relating to a user at the client may be provided in the network. The user profile data may define rights and access privileges to resources relating to the application/service assigned to the client.

In the system, a configuration management interface may be provided defining logical data interfaces to resources relating to the application assigned to the client utilizing the user profile data.

In the system, a virtual drive map of files relating to the application/service may be built on the client. Therein, the drive map may utilize information from the user profile data and provides access of the files from the server to the client and from the client to the server.

In the system, a mapping of icon files and resources resident on the server may be provided to the client; and icons relating to the icon files may be generated in a dedicated area in a GUI.

In the system, the dedicated area is a start application area or a system tray area.

In the system, when the resource resides on the server, at the client the resource may be reconfigured to present the resource to the user as a client-based resource through the client. Also, the mapping may be utilized to present icons on the client indicating where applications/services reside, which may be implemented by the client.

In the system for server applications/services residing on the server, icons relating to files using the server applications/services may be presented to the client with a unique server indication when files associated with the applications are presented to the user.

In the system, when the resource resides on the client, an icon indicating that the resource resides on the client may be presented to the client. In the system, when the resource resides on the server, an icon indicating that the resource resides on the server may be presented to the client. In the system, the mapping may be used to overlay (e.g. ignore) icons that do not indicate correctly where the resource resides.

In the system, when said resource resides on said server, at said client a menu bar is presented in a GUI resources are reconfigured on said client via the access system, presenting said resource to said user as a server-based resource through said client.

In a third aspect, a method for presenting information to a client in a network where a resource, such as an application, database (either local, server, or web-bsed), service and/or a file, is stored in at least the client or a server in the network is provided. The method comprises: asking a user at the client to select whether applications/services for files/data accessible by the client are to be searched first from a location comprising the client and a server in the network; and utilizing information from a response to associate an icon associated with the file/data if the response indicates that the file is to be associated first with a remote application.

In the method, a user profile data relating to a user at the client may be provided in the network. Therein the user profile data defines rights and access privileges to resources relating to the application assigned to the client.

In the method, a configuration management interface may be provided defining logical data interfaces to resources relating to the application assigned to the client utilizing user profile data.

In the method a virtual drive map of files relating to the application may be built on the client, utilizing information from the user profile data and providing access of the files from the server to the client and from the client to the server.

In the method, for applications residing on the server, at the client a menu bar is presented in a GUI presenting the application to the user as a server-based application.

In the method and systems, port knocking and load balancing may be performed between the client and server when accessing a resource stored at the server.

In other aspects various combinations of sets and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 8C is a flow diagram showing messages sent during port knocking between elements of the network system of FIG. 1B;

DETAILED DESCRIPTION OF AN EMBODIMENT

Figure 1A:
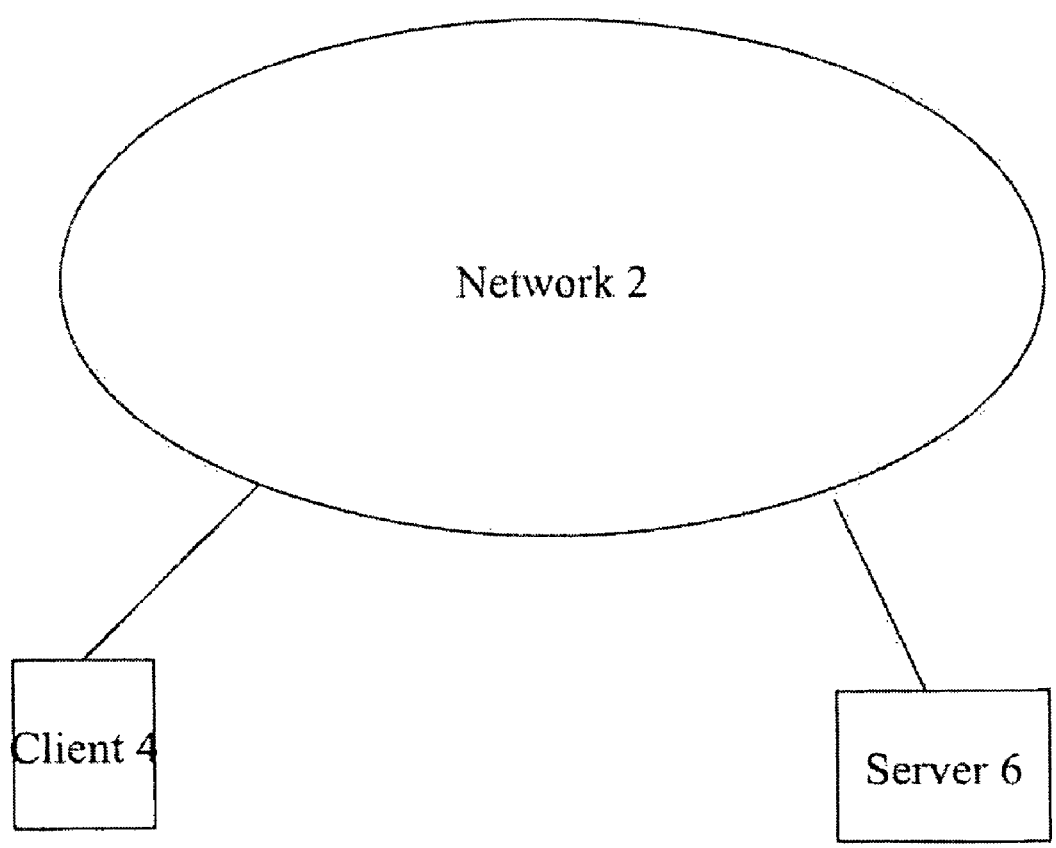
FIG. 1A is a block diagram of a network associated with an embodiment.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

An embodiment generally comprises a system and method of sharing files and other resources, such as applications, files, services, data and other information, amongst elements in a network, such as a client and a server. In particular, a user at the client has local files, data, applications and services stored thereon and the server also has files, data, applications and services stored thereon. Frequently, an instance of an application or service may be installed on both the client and the server, e.g. Microsoft Word™ Microsoft Excel™. The embodiment provides the client with access to both applications and services and allows the client to specify from which source (e.g. client or server) to first seek activation of the application or service. In providing such access, the embodiment provides bi-directional views of resources for both the client and the server. As an additional function, the embodiment may provide an additional graphic or text notation to the user at the client through an icon on his client interface of whether a file (or data) associated with an application (or service) will be using either a local (client-side) instance of the application or a remote (server-side) instance. In other instances, no indication of any specific notation association of an application/service and or file/data to application/service is provided by the icon. This facilitates a perception that all files, applications, services and data are locally installed at the client. In order to facilitate these functions and operations, data relating to a client, its local applications, local files and access privileges are stored and selectively accessed by the server. Although the description provided herein focuses on sharing and accessing files/data and applications/services, the embodiment can also be used to share any resource which may be accessed in a network. Such resources may include: files and applications (as noted earlier), databases and services. An embodiment can separately handle files, data, applications and services; however, there are similarities in handling files and data and similarities in handling applications and services. There are further other similarities in handling files, data, applications and services. It will be appreciated that when the term "file" is used, a similar feature or function can be provided for at least data (without explicitly mentioning data). It will further be appreciated that when the term "application" is used, a similar feature or function can be provided for at least a service (without explicitly mentioning a service). Further detail on these features and functions are provided below.

Figure 1B:
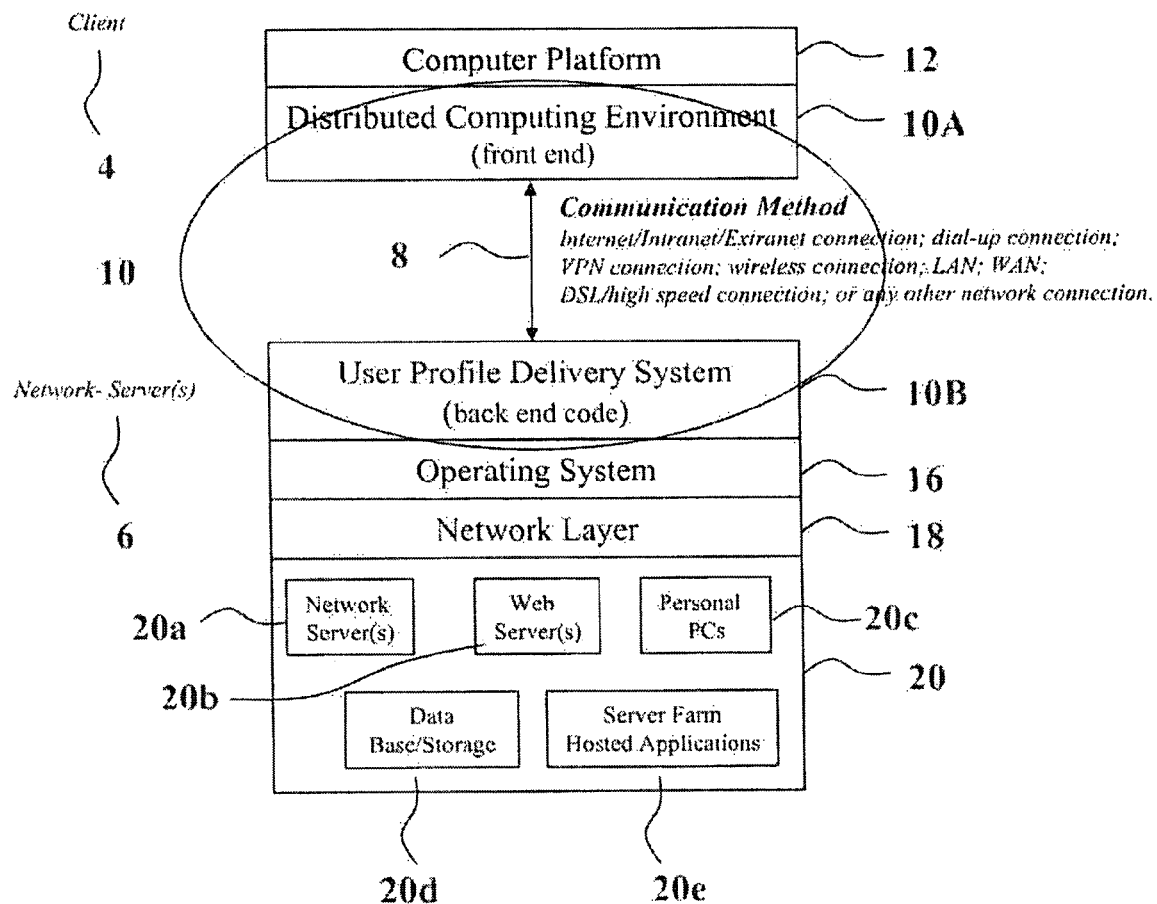
FIG. 1B is a block diagram of aspects of a client and a server in a network system in said network associated with an embodiment.

Referring to FIGS. 1A and 1B, for the embodiment network 2 is provided comprising client 4 and server 6. Network 2 may be any network architecture allowing remote access by client 4 to server 6. Exemplary architectures include systems using Intranet/Internet/Extranet TCP/IP connections, dial-up connection, VPN connections, LANs, WANs or DSL, wireless, cable modem or any other type of connections or architectures. Server 6 may be a single server or comprise multiple servers. Communication link 8 connects client 4 to server 6 and provides one or more conduits for transfer of data, files and information therebetween. As an interface and mechanism for the transfer of data, files and information between client 4 and server 6, user profile system 10 is provided amongst client 4 and server 6, which utilizes communication link 8 effect the transfer. User profile system comprises front end interface 10A located in client 4 and back end interface 10B located in server 6.

Figure 2:
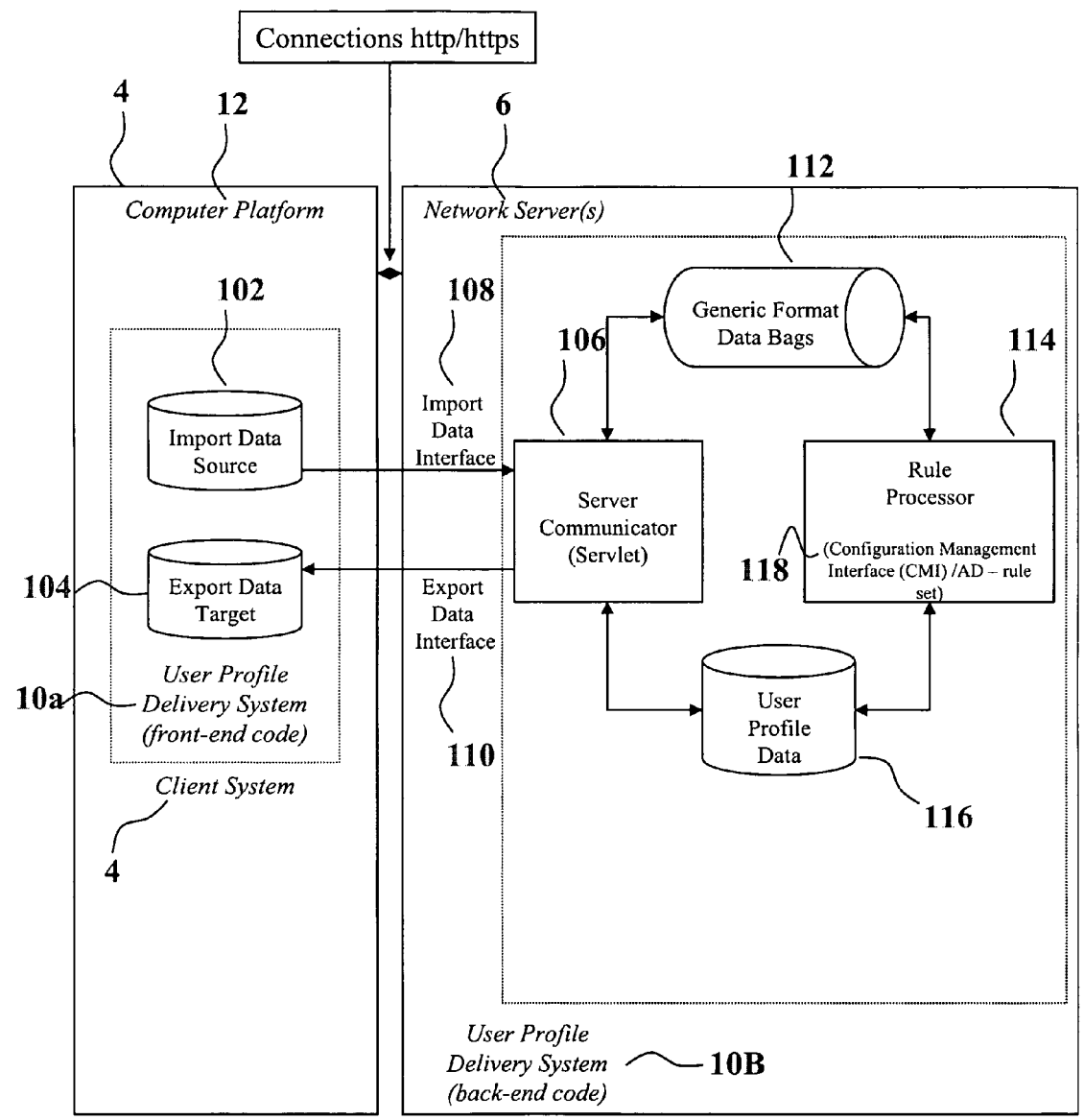
FIG. 2 is another block diagram of the network system of FIG. 1B.

Referring to FIGS. 1A, 1B and 2, further detail on client 4 is provided. Client 4 comprises computer platform 12 having typical, known components, including a microprocessor (not shown), memory (not shown), secondary storage hard drive (not shown) and software installed thereon which allows client 4 to install and operate applications. It will be appreciated that client 4 may be a thin client, such as a SunRay thin client. Client 4 also includes distributed computing module 14 embodied in software and hardware components, which enables it to access network 2. Front end interface 10A of user profile delivery system 10 is embodied in software and provides front-end code operating as a data storage and transmission interface with server 6. It includes import data source 102 and export data target 104. Data source 102 contains transmission data (userids/passwords, file commands, other input) related to client 4. Target data 104 contains responses from server application 6, including icon data, document files and desktop view data.

Server 6 comprises back end interface 10B of user profile delivery system 10, operating system 16, network layer 18, and various individual computing components 20, including network server 20A, webserver 20B, computer 20C, database 20D and server application 20E. Back end interface 10B is embodied as software and provides an interface for server 6 to client 4 through its front end interface 10A and comprises communication server 106, an interface with import data interface 108, an interface with export data interface 110, generic format databags 112, rule processor 114, user profile data 116 and configuration management user interface 118.

Databags 112 provide transport for a remote procedure call (RPC) interface and may contain string or serializable java objects, which get serialized and deserialized on each end of the connection with the communication server 106. Rule processor 114 defines and implements rules of operation for server 6. User profile data 116 provides data for export data target 104. Configuration management user interface 118 provides a module for controlling and assigning the user profile data 116.

Figure 21:
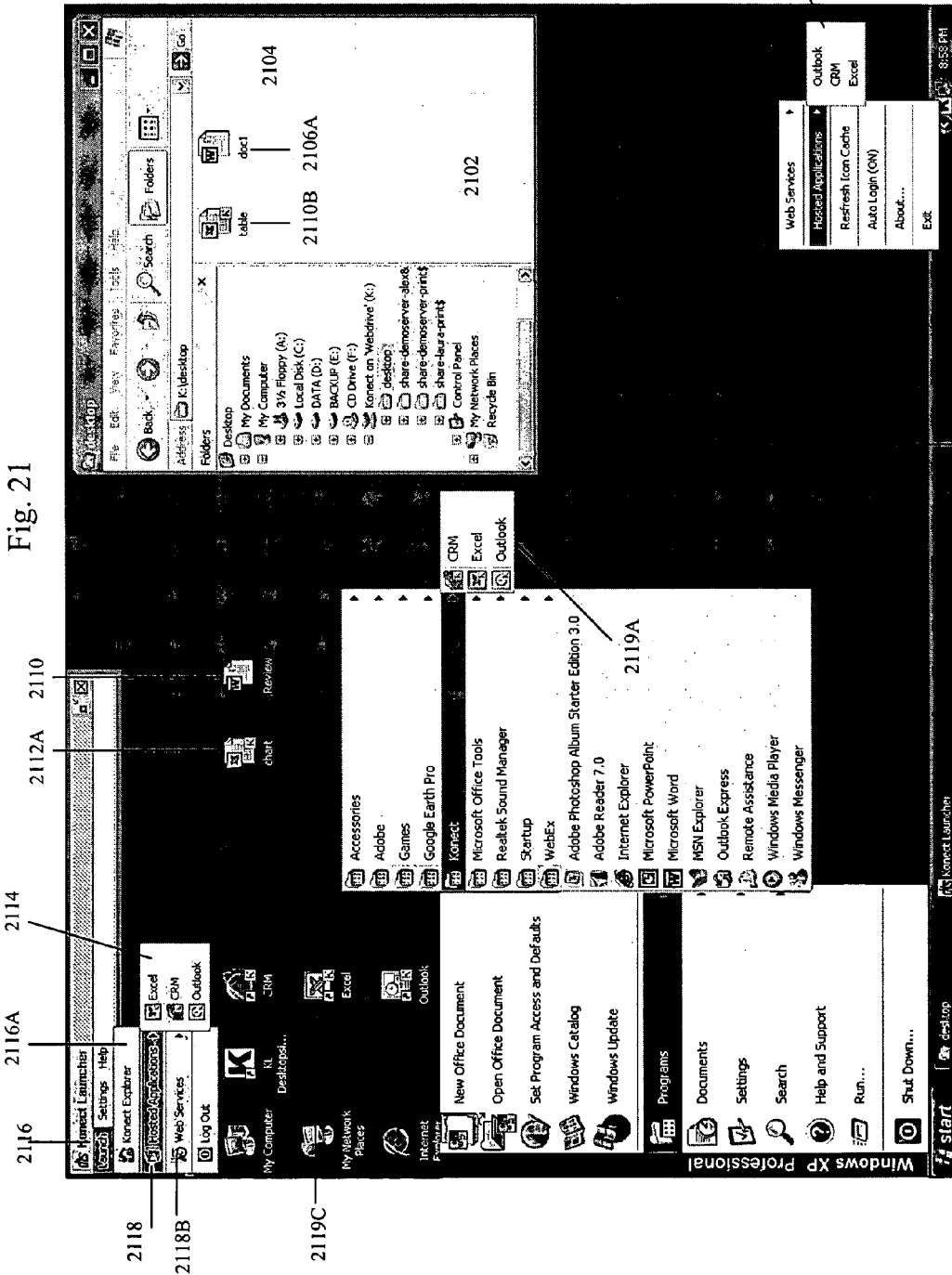
FIG. 21 is a diagram of a screen display for the embodiment generated on a client associated with the network system of FIG. 1B.

Referring to FIG. 21, when a user at client 4 initiates the embodiment, on the display associated with client 4, screen 2100 is generated by software operating on client 4. Further, when the user authenticates onto server 6, he can view files/data stored in directories associated with server 6 as well as local files as provided in window 2102. The server files and data may be dynamically integrated and created on the client interface and may be accessed using the client. In such an embodiment, the user may utilize web browsing software (such as Explorer™) on the client to access files/data. Entries 2104 provide individual icon and text information relating to files/data associated with client 4. For example a Microsoft Word document™ entitled "doc1" is listed is shown, with the title of the document and its associated icon 2106A. In client interface 2100, icon 2110 is showing a file located on client 4 which also uses the Word application. As is typical with client interfaces, activation of a mouse click when the mouse pointer (not shown) is upon icon 2110 will launch the associated application and open the file in the application. It will be appreciated that the user profile data interface on client 4 may be implemented as one or more types of interfaces such as a desktop launcher, server desktop, client desktop, portal, or a client-based system.

The embodiment can provide visual information to identify a location in the network of an associated application for a file. Icons 2112A and 2110B have a subscript "K" displayed therein. This notation indicates that the location of the associated application/service does not reside on client 4, but on actually on server 6. It will be appreciated that in other embodiments, any other visual notation may be used, including using no notation.

In the top portion of window 2100, pull down menu 2116 provides a list of additional services and applications available to the user. Hosted application selection 2118 provides a listing of server-based applications 2114 which may be activated by the user. From the pull-down menu, a separate hot key 2116A, link or icon may be provided allowing a user to open a window 2102 on the client interface on client 4. From the pull-down menu 2118B web services may provide a listing of web-based applications which may be launched by the user on client 4. From the pull-down menu, server/web based applications may be visually differentiated from local applications by providing an different icon than an icon for a corresponding server-based application. In this particular implementation, the known icon for a Word application is augmented with a "K", as shown. Other visual keys may be implemented, including using no notation.

It will be appreciated that at client 4, the client interface providing information on elements/resources such as files, data, applications, services and web-based services can provide several types of icons and cues to a user at client 4 providing different information and access capabilities for the element through the client interface. For example, an icon can be provided representing a "shortcut" for its associated application/service. The shortcut icon can be displayed in the client interface on client 4. Icons may be populated on client interface dynamically creating 2119C shortcuts to networked elements/resources from server 6. These resources may also be accessed in the starts program and the system tray of the client 4. Published applications and services with their correct file/data type associations may be displayed on client 4. To the end user, these applications and services appear as they are locally installed on the client 4. Again, a special notation may or may not be used to indicate that these applications and services are from server 6.

The client interface, such as a GUI, may dynamically create a special link to a folder or link in a dedicated area of the GUI. Such a link or folder may provide a list of application/services and their associated icons for frequently accessed elements/resources on client 4. Such a folder or link may be labeled as a remote application folder. One dedicated area of the client interface may be in a frequently accessed area, such as in a start menu area 2119A in Microsoft Windows GUI or in an activation area. An activation icon/bar having information on system level matters of client 4 may be provided. The activation 2119B icon/bar may also include icons for accessing elements/resources on client 4. For example, in a Microsoft Windows GUI, an activation icon/bar may be located in a "sys tray" region 2119B which is generally located at the bottom right hand area of the client interface on the client 4. Other types of icons having other types of associations and functions may be provided.

Figure 3:
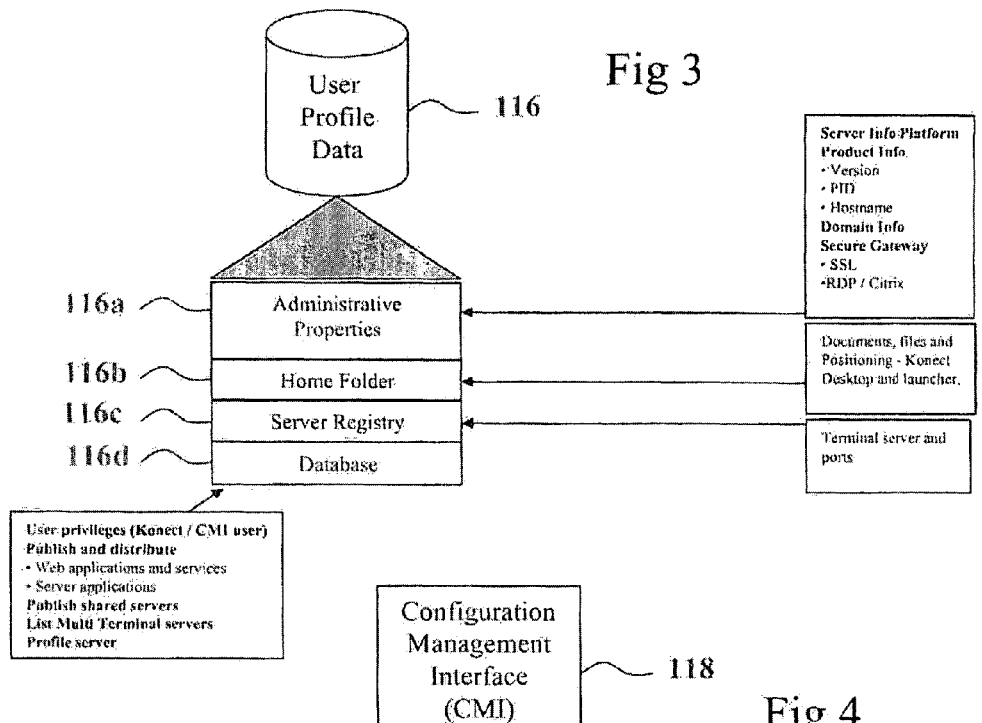
FIG. 3 is a block diagram of a user profile data structure used in the network system of FIG. 1B.

Referring to FIG. 3, in order to assist elements in network 2 to track location, privilege and sharing rights of files and applications, access data for a client 4 needs to be stored and communicated with server 6. In the embodiment, user profile data 116 is used for this purpose. It includes data relating to administrative properties 116a, home folder 116b, server registry 116c and database 116d. In particular, user profile data 116 stores configuration information for back end interface 10B. Data for administrative properties relate to application settings, e.g. hostname, process id, version and installation location. Data for home folder contains a specific user's information, such as data relating to his shared folders, desktop (home) folder, icon positions and documents. Data for the server registry contains port and addresses data for the servers 106. Database 116d stores registered applications, published shares and server 106 information. These settings in the user profile data, may all be configured by a system administrator, via the configuration management console and the back end interface 10B.

Figure 4:
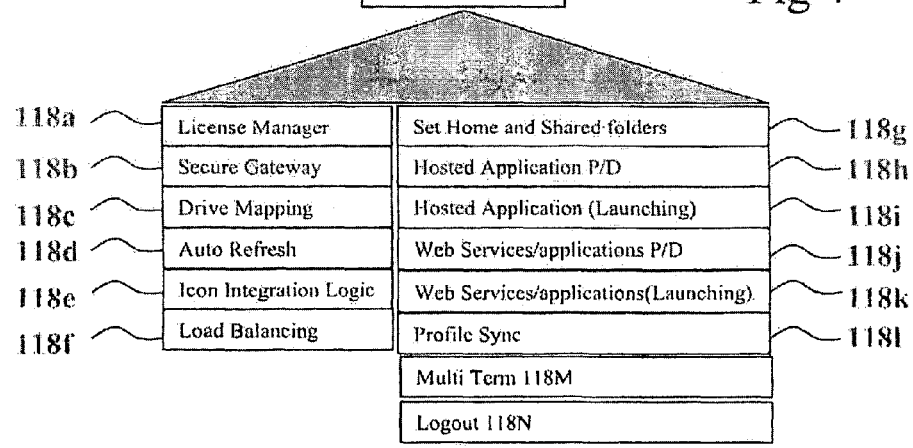
FIG. 4 is a block diagram of a configuration management user interface used to define the user profile data structure of FIG. 3 for the network system of FIG. 1B.

Referring to FIG. 4, similarly, in order to track access and privilege settings for an application by a client 4, configuration data needs to be stored and communicated within elements in network 2. As such, configuration management for the application is provided through a configuration management user interface implemented as a web application that allows a system administrator to configure the settings for the entire application. Configuration data is assigned as configuration management user interface data 118 and comprises license manager 118A, secure gateway 118B, drive mapping 118C, auto refresh 118D, icon integration logic 118F, load balancing 118G, set home and shared folders 118G, hosted application P/D 118H, hosted application launching system 118I, web services P/D 118J, web services application launching system 118K, Profile Synchronization 118L, Multiple Terminal Servers (Server Farm) 118M, and logout functions 118N.

Figure 5:
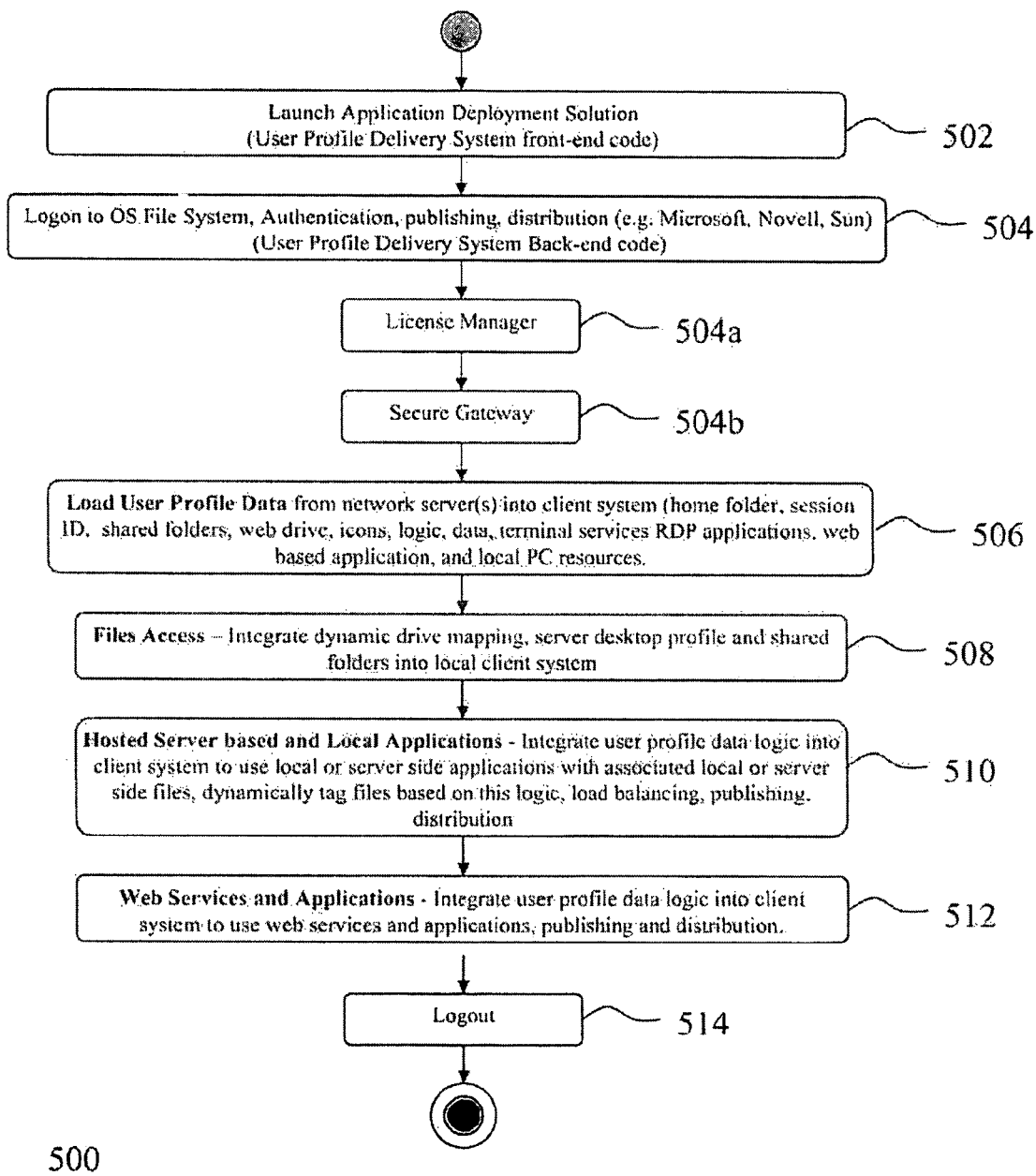
FIG. 5 is a flow diagram showing operations of the network system of FIG. 1B.

Referring to FIG. 5, in order for a client 4 to assess its privileges and access rights to files, applications, and services with other elements in network 2, the other elements, notably server 6, need to obtain relevant access information from client 4. To assist in this process, client 4 delivers its data to server 6 through a delivery process. Flow chart 500 shows elements of the profile delivery process. In particular, to initiate the process in step 502 a user at client 4 launches delivery system 10 and invokes back end interface 10B through an appropriate signal carried over communication link 8. At step 504, to successfully launch a user's profile, the user needs to provide user identification credentials at logon to enable client 4 delivery system 10 to access back end interface 10B.

In step 504a license manager is invoked once communications between client 4 and server 6 are established. The license manager monitors the number of users accessing server 6 to ensure that there are enough valid user licenses available for the software, before authenticating a user to his user specific user profile. In step 504b secure gateway can be turned on or off to access server 6.

In step 506 once a user is successfully authenticated, back end interface 10B exports user's profile data 116 via the server communicator 106 to export data target 104. User profile data 116 that is loaded into client 4 is used to interpret the user profile data interface, specific to each user and contains all the user rights and access privileges to network resources assigned to that user via the configuration management user interface 118. User profile data 116 contains attributes allowing the user to the following data: home folder, session ID, server desktop files and folders, shared folders, web drive, icons, logic, data, terminal services published applications, web based applications and services, and local PC access and local PC integration of server resources.

In step 508 user profile data contains attributes that dynamically map the local client 4, thereby making single or multiple server-network folders, files, and shared folders available to the user via client 4. During configuration, back end interface 10B stores the data of all published servers and PC's available to all users in the Users profile delivery database 116d. At runtime, the system retrieves which servers and shares are permitted access to the individual client user, and builds a hierarchy of shares in IIS, complete with access permissions, mapping each individual share to a WebDAV folder in that user's unique virtual directory. WebDAV is the Web Distributed Authoring and Versioning extensions supported by IIS to allow bidirectional file access via HTTP/HTTPS, and virtual directory refers to an IIS virtual directory.

In step 510, server based hosted applications are published and distributed to specific users via the configuration management user interface 118. User profile data 116 dynamically checks for both local and server published and distributed applications and their associated icons. User profile data 116 uses icon logic to accurately populate the user profile data interface on client 4. Files on client 4 using server based application may be tagged with a unique smaller second image icon object that may be integrated into client 4's standard desktop icon image object to differentiate files that are utilizing a server-based application versus a local application. Back end interface 10B may publish and distribute server-based applications to multiple servers to improve performance to multi-user environments. Server 6 may allow listing of several servers IPs in the server registry and then allow a distribution load balancing method of accessing hosted applications to be selected respective to the amount of users requesting this service. Distribution methods such as CPU load monitoring, round-robin methods, per-user per server count and random distributions.

In step 512, server 6 publishes web services and applications for distribution to specific users via configuration management user interface 118. The user profile data will accurately populate the user profile data interface on client 4.

In step 514, a logout process is provided wherein server 6 closes the user profile data interface on client 4. As a GUI, the user will click on the "x" in the top right hand corner of the active window or from the pull down tab selecting logout. Selecting yes will logout the user and disconnect his user profile session.

Figure 6:
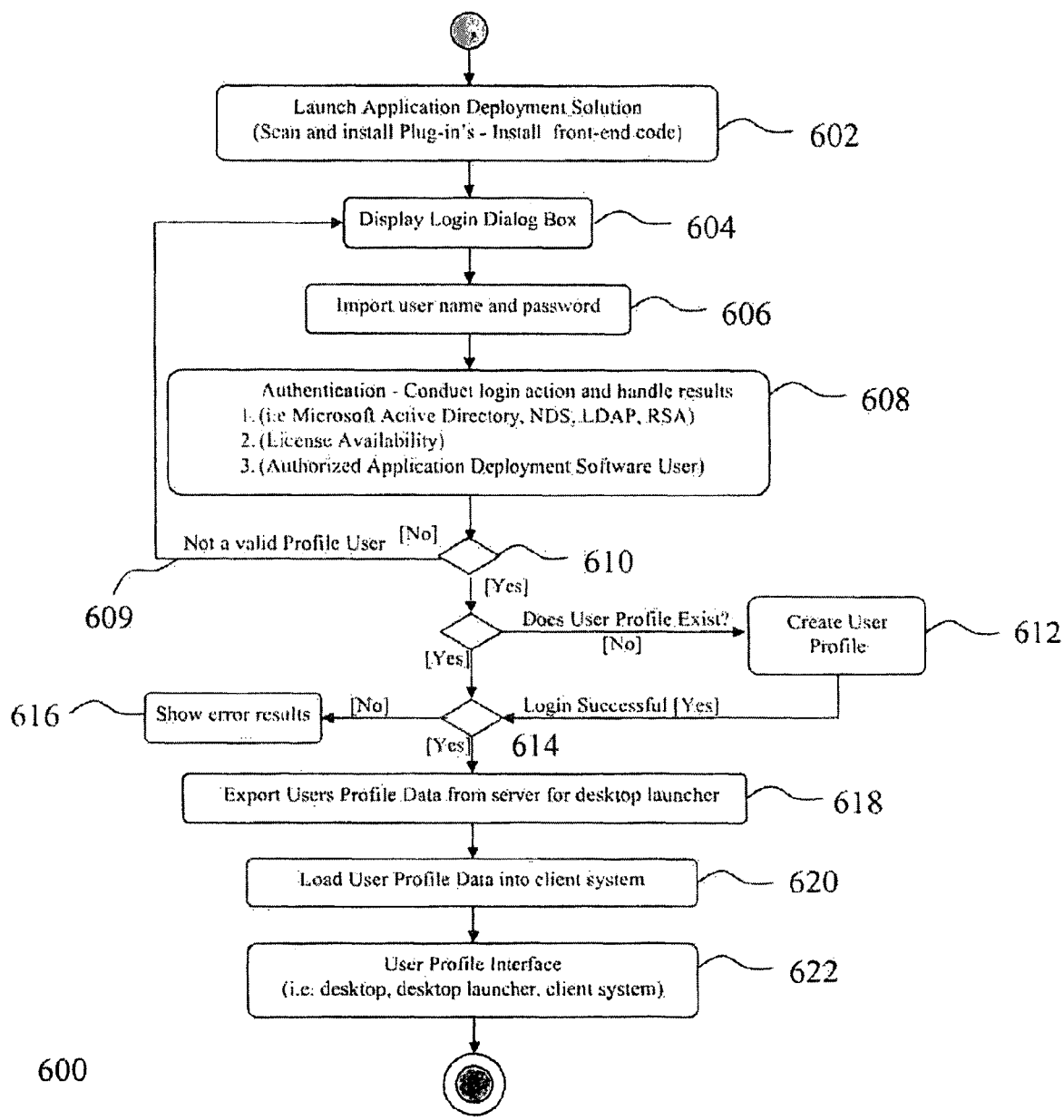
FIG. 6 is a flow diagram showing login operations of the network system of FIG. 1B.

Referring now to FIG. 6, as part of the accessing of information a user at client 4 needs to first access delivery system 10. This access is provided through login routine 600. Therein, at step 602 the user launches from client 4 user profile delivery system 10a, which then invokes back end interface 10B by through a signal sent over link 8. It may be necessary to require a one-time install of a plug-in such as a JVM plug-in to run the application. Client 4 scans and detects if the plug-in is installed and, if not, a user will be prompted to install the plug-in. Thereafter, delivery system 10 may be installed onto client 4. Once installed, in step 604 the user is prompted with a display login box on client 4. In step 606 the user is required to input specific credentials such as user name and password by way of an external input means interfaced with client 4, such as a keyboard. Import data source 102 is then sent via the import data interface 108 to the server communicator to retrieve the user's profile data 116. In step 608, the import data bags 112 are processed through the rule processor 114 to handle results. Rule processor 114 uses known authentication protocols such as Active Directory (AD) available from Microsoft, Novell Directory Services (NDS), LDAP, RSA security, or any other type standard authentication protocols to authenticate users. The user must also be assigned as a valid user of the system via the configuration management user interface. At decision point 610 if the user is not a valid user on server 6, the user will be prompted with the login dialog box and text display telling the user "login failed" at 609 and the user is required to retype his user credentials. In step 612, if the user is a valid user on server 6, the user is required to have an existing user profile on server 6. If the profile does not exist, the user profile is created for the user by the user profile delivery system. At decision point 614 if there is a problem with creating a user's profile on server 6, an error message is displayed to the end user that the user profile does not exist at step 616. If the user and a user's profile exist on server 6, the user is successfully authenticated at step 618. The user profile via back end interface 10B will then get/retrieve and export the user's profile data 116 via server 106 to the export data target 104. At step 620, user profile data is loaded onto client 4. At step 622, user profile data interface is used to interpret the user's profile data on client 4. It will be appreciated that the user profile data interface on client 4 may be implemented as one or more types of interfaces such as a desktop launcher, server desktop, or a client-based system.

Figure 7:
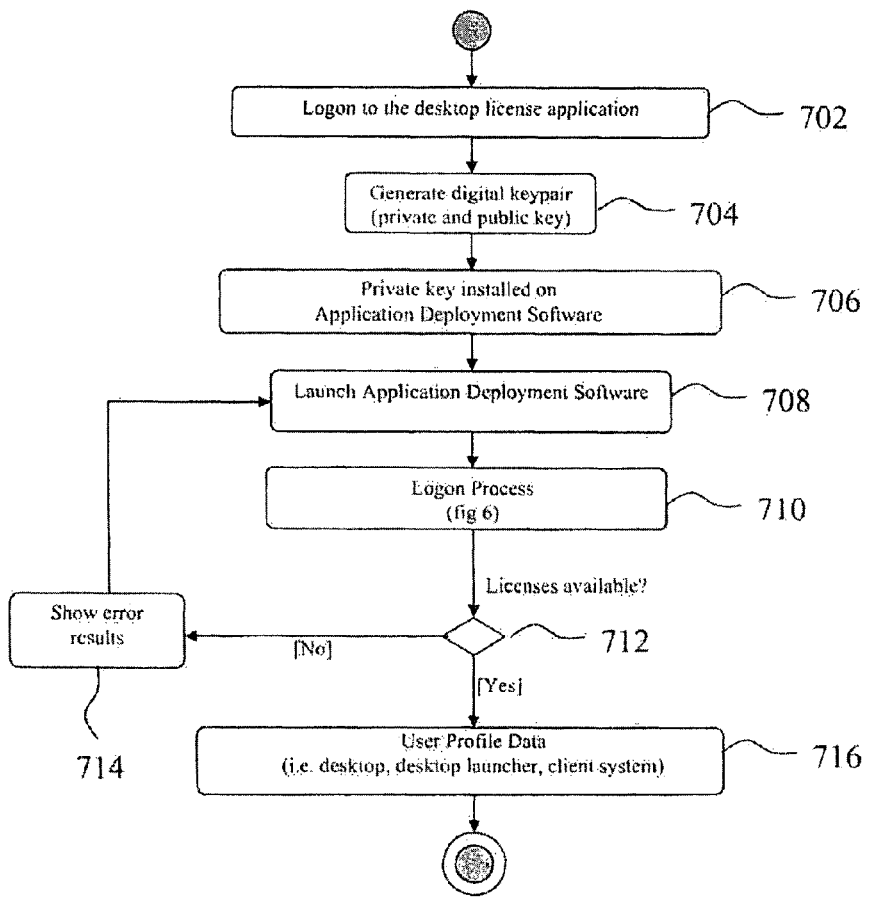
FIG. 7 is a flow diagram showing generation of a license key to manage valid users of the network system in FIG. 1B.

Referring now to FIG. 7, a license manager routine implements a logon process as shown generally at 700 confirms that a valid license for a set number of concurrent users for the Application Deployment is available for a user who is attempting to login to access their User Profile Data on the server. A user will be unable to utilize the system if a valid license is not available. Only the license key generated by the license manager application is sent to the administrator. The license key is installed onto server 6 via configuration management user interface 118.

At step 702, the license keys for the application deployment are generated by a system administrator using a license manager application. Upon a successful logon to license manager application, at step 704 the license manager application generates a license key which encodes the number of users able to concurrently logon to-the server and contains a digital key pair that preferably will only work with a specific version release of application installed on client 4. The digital key pair generated is made up of both a public digital key and a private digital key. The public key is integrated into back end interface 10B. At step 706 the private digital key is encoded in the license key for the specific version release is delivered to the customer via email or CD format and is installed on server 6 via configuration management user interface 118. At step 708, when there is a match between the private key and the public key the user is provided access to the system. At step 710, server 6 checks whether there is a valid license available for the user attempting to logon to server 6 to access his user profile data. At step 712, if a license is not available, the user will be prompted by an error message 714 informing him the situation. If there is a valid user license available, the user will successfully complete the logon process. Subsequently, at step 716, the user profile data interface interprets the user profile data on client 4.

Figure 8A:
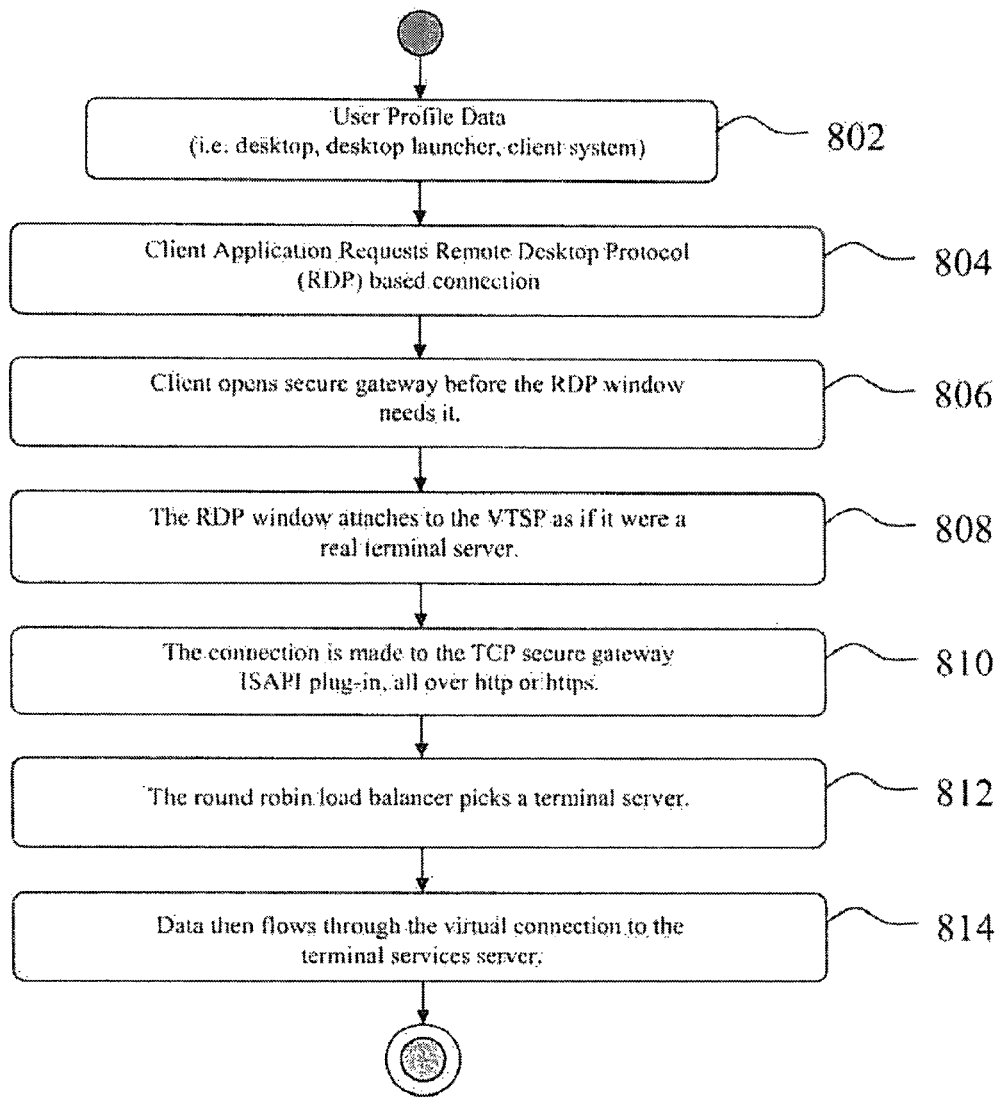
FIG. 8A is a flow diagram showing set-up for a gateway operation of the network system in FIG. 1B.

Referring now to FIG. 8A, the secure gateway sets up a secure tunnel between client 4 and server 6 when using hosted server based applications, as shown generally at 800. The secure gateway provides a tunnel for all server-based application data from network terminal services on server 6 through standard ports 80 (http) and 443 (https). This allows the network to function without compromising security by having to open additional firewall ports to extend hosted server based hosted applications from one or more server 6.

The secure gateway may require a one-time install of a plug-in such as an active x plug-in on client 4 to run the hosted server based application. Client 4 can scan and detect if the plug-in is installed, and if not, a user will be prompted to install the plug-in. Once installed, each user from their user profile data interface may access user specific hosted server based applications that have assigned to them as defined by the configuration management user interface. At step 802 the user profile data is used to interpret the user profile data interface on client 4. At step 804 from the user data interface (which could be one or more, or a multitude of interfaces such as a desktop launcher, server desktop, or client 4), the user can invoke secure gateway tunneling by requesting a server-based hosted application, using for example a Remote Desktop Protocol (RDP) based connection. The user request is sent from client 4 to server 6 via an import data interface. Server 6 then establishes a TcpTunnel ISAPI plug-in, which reads the configuration information from server registry 116c. The TcpTunnel plug-in is directed to several Terminal services, of which one can be client 4 that the plug-in is running on. At step 806 client 4 opens the TcpTunnel before the RDP window needs it. The RDP window then attaches to the Virtual Terminal Services Port (VTSP) as if it were a real terminal services server at step 808. The client, when ready to connect to the Terminal Server behind the firewall, starts its tunnel, creating a Virtual Terminal Services Port (VTSP). When the Client requests a connection to VTSP, it then begins to send connection information across the wire.

At step 810 a connection is made. A client 4 can issue five commands for a connection:
(1) open—This command opens a connection. The command indicates to server 6 that a tcp connection is imminent. It initiates buffers to be allocated and opens the port at server 6 to the destination server.
(2) close—This command closes a connection. A connection is also closed when a connection is broken.
(3) write—This command sends data to an open connection. This command requires no response. It leaves the HTTP/1.1 connection alive, which lowers lag time.
(4) read—This command starts a response thread, which is kept alive, and delivers data back to the client as the destination server has data to send.
(5) readwrite—This command performs one complete read and write of the data. Typically, this command is only used when client 4 cannot communicate with the separate requests.

In one embodiment, port knocking for an available port may be used to identify an available port at the server side. To initiate port knocking, the system can call an appropriate routine, such as TcpKnock.startKnockServer(int portLow, int portHigh), where the portLow and portHigh identify a start and end of the port range opened on the firewall for the knock service. It will be appreciated that port knocking does not require a specific port to be mapped to a specific server. Instead, a specific port sequence knock within a range of available ports is provided to identify an appropriate port to be dynamically mapped to a specific server.

One of those ports may be randomly used for the load balancing connection to server 6. When client 4 is connecting to server 6, at server 6, it calls String combo=TcpKnock.GetCombination( ). The return value is provided to client 4 and identifies the int port=TcpKnockClient.StartConnection(combo) on which to perform porting knocking to identify an appropriate port to open. Once the value is returned, client 4 uses the port number to dynamically map available port to connect to server 6. When client 4 connects to that port (on the WAN interface) with the RDP client, the traffic is routed directly to the target server 6. Without knowing the specific sequence knock within a specified port range, all request trying to scan or access these ports may be rejected. For example, if the port knocking range is from 1600 to 1610, the port knocking sequence will open one of those ports by using a sequence knock established by the server to client for that specific application session. Each application session that is established will have its own knock sequence. When the port is open it will be dynamically mapped to a specific target server port 3389. When the session client 4 is complete, it does not need to do anything further to close the connection, as the RDP connection is closed automatically when the window is closed.

On the server side, at step 812 load balancing is performed. The TcpTunnel plug-in is aware of multiple targets, for when the server wants to use a specific method of load balancing terminal services server. Different methods of load balancing may include CPU load monitoring, round robin method, per user per server count and random. Further detail on load balancing is provided later. At step 814, data on the client 4 then flows through the virtual connection to the terminal services.

Referring to FIG. 8C, the secure gateway may use a port knocking service to enhance the software load balancing feature. The gateway may be implemented as a service running on the server 6. Client 4 communicates with server 6. Server 6 comprises a front-end/back-end (FE/BE) interface 832, a secure gateway 836, an active directory 838 and server 838 containing a set of accessible applications, services, data and files. FE/BE interface 832 can be provided by a Tomcat servlet application available from Apache™. Client 4 communicates with server 6 through messages generated locally and transmitted over link 8. Client 4 initiates an access for an application in server 838 to server 6 by generating a request message to server 6. Client 4 preferably is required to be authenticated prior to launching any applications 838. A Microsoft Active Directory (AD) in server 838 may be accessed by server 6 to authenticate client 4. Various authentication systems and techniques known in the art may be used, including processes such as LDAP, Novell Directory services and others.

To initiate port knocking, the port knocking service must be active (ON) and the FE/BE interface 832 needs to send profile data information about client 4 and the published application (or service related data) and the port knocking key sequence to client 4 via a message over link 8. The port knocking service generates a port sequence/key for the client 4 and sends the key to FE/BE interface 832. Then, FE/BE interface 832 sends the port sequence/key to client 4. When a user at client 4 initiates an application or service, the system may send the key/sequence, client data and IP, user id and the application requested to interface 832, which then forwards the request to gateway 836 and the port knocking service. The port knocking service generates a query for a load balancer associated with server 838 and retrieves the proper application or service IP address. The port knocking service sends applications and/or services IP addresses to FE/BE interface 832 and creates a working directory on the server 6 where these settings are stored. FE/BE interface 832 then sends the application and services IP to client 4. Client 4 does port sequence/key knocking on the designated port set in by server 6. If the port sequence/key knocking is successful, the port knocking service will connect the selected application on server 838 and relay the connection from client 4 to server 838.

Figure 9:
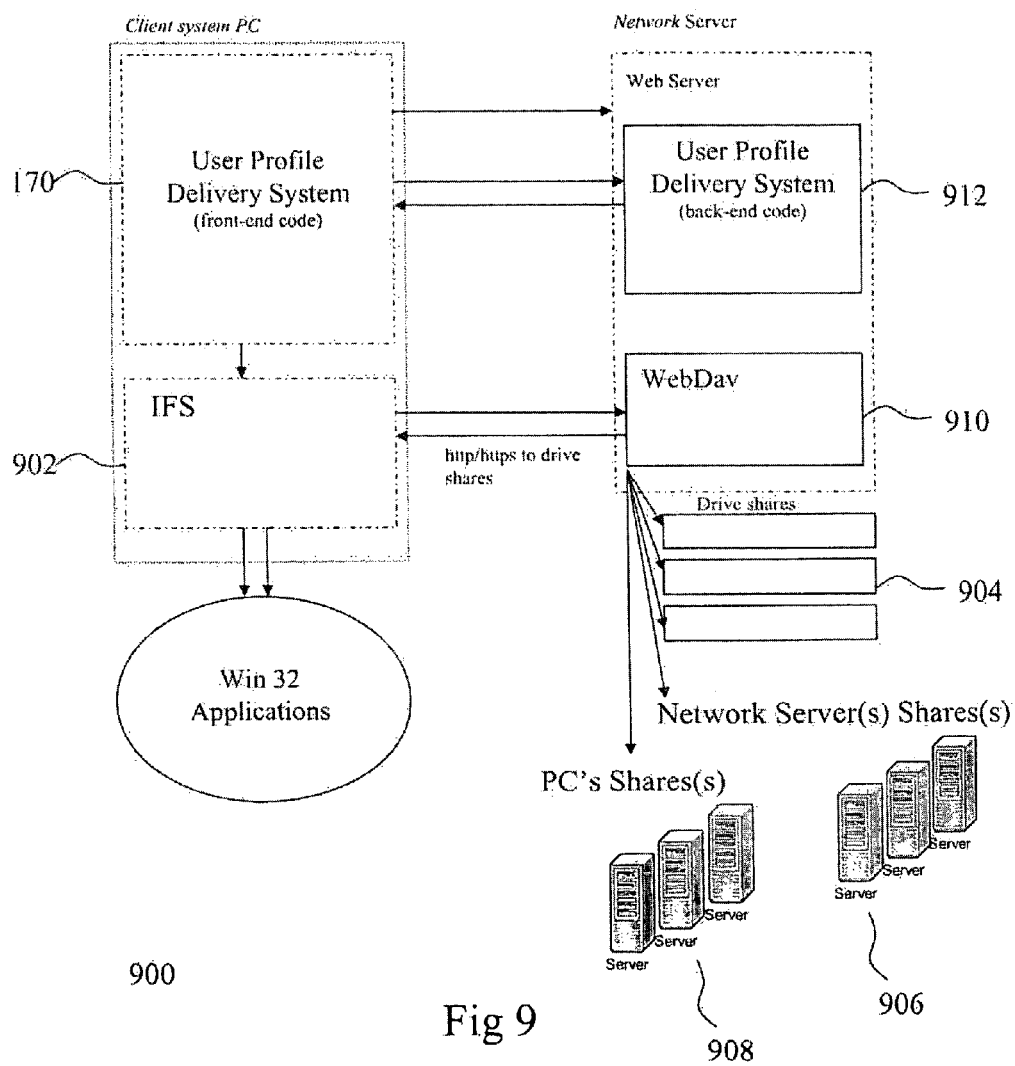
FIG. 9 is a block diagram of the network system of FIG. 1B, during a mapping component operation.

Referring to FIG. 9, after a user at client 4 has signed onto the system, an aspect of the embodiment allows client 4 to access files, applications and services (such as web services) from server 6 as if the files, applications and services were stored locally on client 4. In providing this aspect, virtual drive-mapping component 900 is provided on client 4 and provides the user with a bi-directional view of data, files, and folders from server 6 using back end interface 10B from local and remote sources. In particular, from client 4 to server 6, users can see data, files, and folders from server 6 on client 4. Also, server-based applications and services can access a virtual drive mapping on client 4. Drive mapping component 900 is installed with the other components described earlier in relation to FIG. 2. Rule processor 114 (FIG. 2) builds the user profile data that drive mapping component 900 uses to setup the hierarchy of folders on client 4 that contain the user's individual drive shares and the common drive shares from file servers.

To provide bidirectional views, a virtual drive-mapping component dynamically sets up a client 4 with a bi-directional virtual drive that contains a user's data, files, and folders from server 6, including LAN PC shares on client 4. To the user, the virtual drive is accessed as if it were a local drive on client 4. It is mounted as a drive letter using any free letter the machine may have. Virtual drive-mapping component 900 also monitors for changes in data, files and folders to synchronize information between client 4 and server 6 after a user has successfully logged onto his user profile data interface from server 6. Using virtual drive-mapping component 900, data, files, and folders are transparently moved between client 4 and server 6 via communication link 8. To facilitate the virtual drive mapping, client 4 has an Installable File System (IFS) 902 that communicates at the operating system level to provide a bi-directional view for the user using the local client 4 and client applications (both local and server based applications). The server 6 dynamically builds a virtual directory at the server directory level. Then, the IFS from client 4, reads this virtual mapping directory. Depending on the client's selected preference in searching applications (i.e. to search for either local or server applications first), the user profile obtains and stores an inventory of both local and server based application, their extensions and their associated icons.

The user profile also reconfigures the local client 4 to utilize this application to file association. The client bi-directional view means that a user can use either a local or server based application to save file back to the server using the virtual drive mapping. For example the bi-directional view allow using a local client application to save a file to the server. Therein, when a local word application is used on client 4, the user is able to: open the word application; edit document; and select "save as" and identify a server folder located by the dynamically virtual mapped drive on the client 4. As another example, the bi-directional views allow using a server hosted application to save a file to the server. Therein, when a server word application is activated on the client 4, the user is able to: open the word application; edit a document; and select "save as" and identify a server folder located by the dynamically virtual mapped drive on the client 4. In operation for the user, the virtual drive is assigned a drive letter that appears to be just like any other locally mapped drive. IFS 902 may be integrated into delivery system 10 and is loaded transparently for the user. The virtual drive-mapping component on client 4 dynamically selects the first available drive letter not used on client 4. The system may, once granted security access via a signed certificate that accompanies the download, dynamically install new drivers allowing IFS 902 to map in new drives if needed. The IFS allow multiple paths 904 on the network-server 906 and PCs 908 within a LAN or WAN to be mapped into a single drive letter on client 4, building a complete virtual drive which may include the user's home profile and multiple shared data, drives, folders, and files on one or more network-server and personal PCs.

The virtual drive-mapping component dynamically maps client 4 using rule processor 114 (with rule sets defined in the user's profile data), which utilizes an authentication protocols, such as Microsoft's AD, to determine what access rights and privileges a user has to the server and personal PCs within a LAN or WAN. Using the windows API and these access rights and privileges, the WebDav server 910 is created to dynamically map the user's shared data, drives, folders, and files into a specially configured web server that provides access to these server 6 and PCs share within a LAN or WAN. These access rights and privileges are then extended and utilized by the virtual drive-mapping component on client 4 to dynamically map client 4. The virtual drive-mapping component communicates with back end interface 10B of server 4 via any of one of several types of connections, including: an Internet/Intranet/Extranet connection; dial-up connection; VPN connection; wireless connection; LAN; WAN; DSL/High speed connection or any other network connection. This allows a standard security measure to be installed, without the need to build additional modules. The WebDav component is installed in server 6 and may be hosted from a variety of WebServers including IIS from Microsoft, Apache and Tomcat. WebDAV is the Web Distributed Authoring and Versioning extensions supported by IIS to allow bidirectional file access via HTTP/HTTPS. Extensions exist to support WebDAV on other HTTP/HTTPS servers as well. This, coupled with the use of WebDrive as the IFS (Installable file system) on client 4, a drive letter is mapped into a virtual directory on the server, which contains the hierarchy of shares created in step 508.

Figure 10:
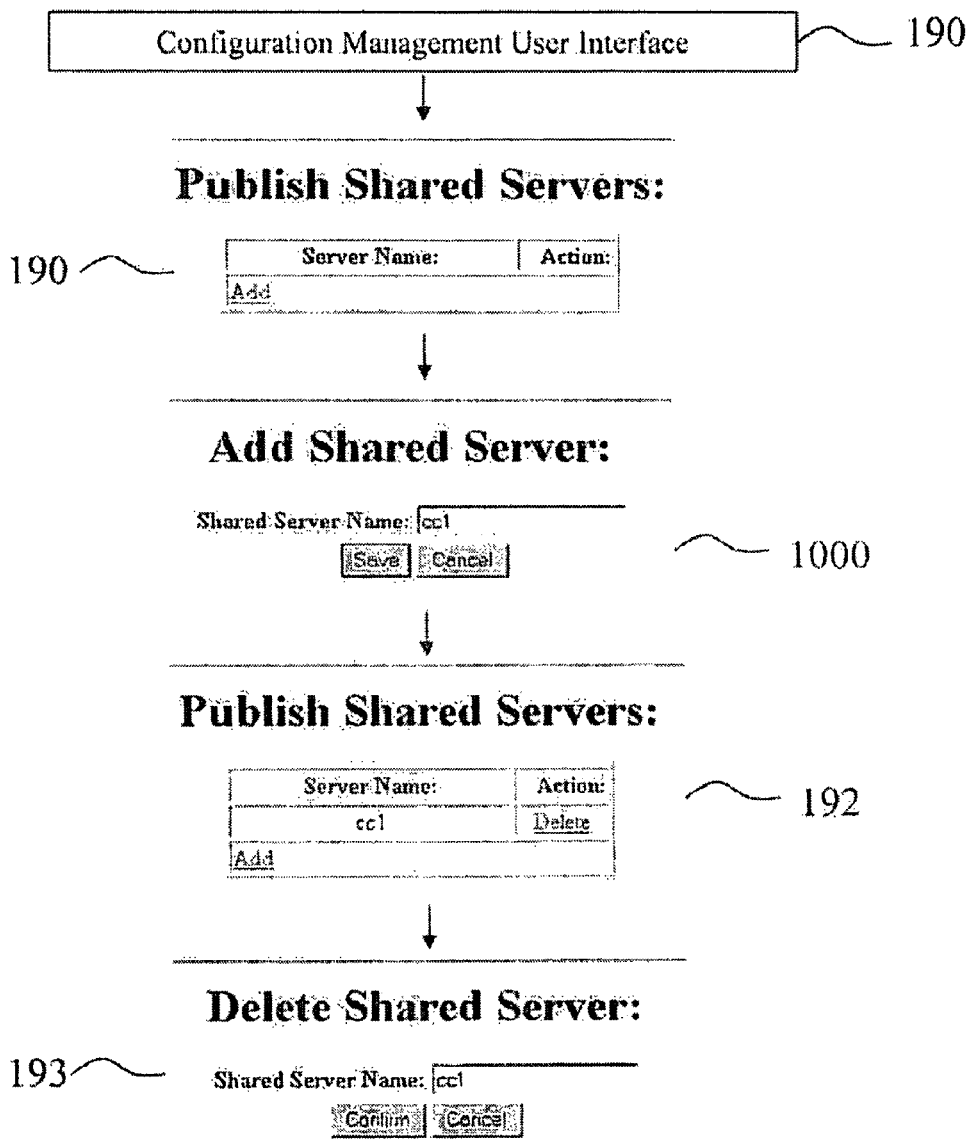
FIG. 10 is a diagram showing an exemplary access control GUIs for the network system of FIG. 1B.

Referring to FIG. 10, detail is provided on access control by a client 4 to servers 6. As an interface, GUIs within the configuration management user interface are used to control access levels for users to servers 6 and PCs within a LAN or WAN environment. A user may have access to one or more shared servers 6 and/or PCs as defined by configuration management user interface 118. One of many views and ways to do this is for the administrator to add the specific server and/or PC via the configuration management user interface. A server and/or PC may be published via an "add" command. In this example the server name "cc1" is provided to the shared server name dialog box 1000. The server name may then be canceled or saved into the database within user profile data. Once published, the user may have access to one or more specific shared server and/or PCs that are defined by his user profile data, which is retrieved from back end interface 10B. Server 6 and PCs are dynamically mapped at both the server 6 and client 4. Shared server and/or PCs can also be removed by selecting the delete function of the specified server or PC. Selecting confirm will delete the specified server and/or PC via the configuration management user interface. Cancel will abort the delete operation.

Figure 11:
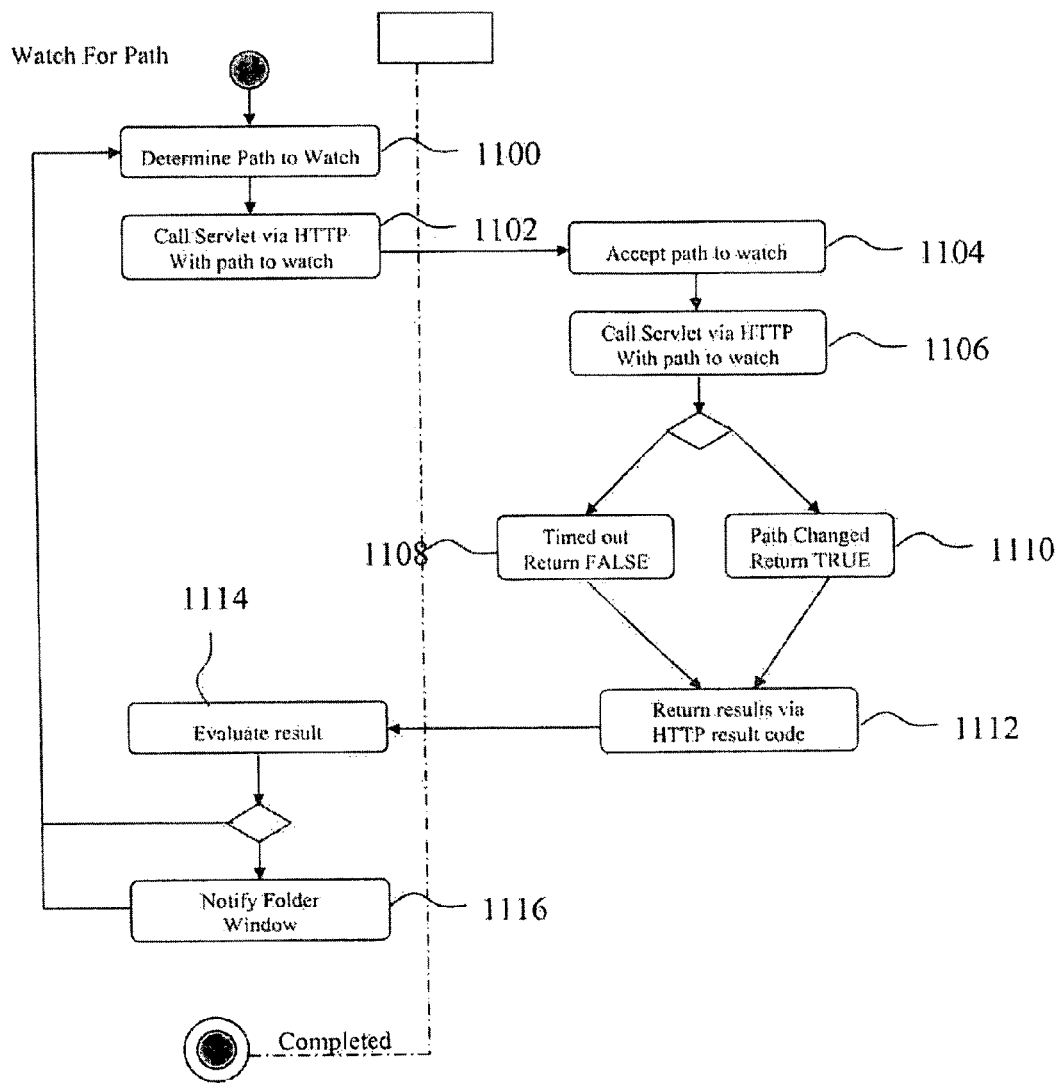
FIG. 11 is a flow diagram of an auto refresh function performed by the network system of FIG. 1B.

Referring to FIG. 11, as the system operates in real-time, files, applications and servers may be dynamically added and deleted. The embodiment manages updates of system information for client 4 using an auto refresh module. The logic flow of the auto refresh module has first at step 1100 virtual drive mapping component 900 determining appropriate path or paths that must be monitored on server 6, by the auto refresh module to any changes to server data, files and folders. This auto refresh module synchronizes both client 4 and server 6 to ensure users have access to server data, files, and folders is accurately represented on client 4 in real time. At step 1102 once the path or paths have been established, the user profile data interface establishes a loop, which periodically asks server 6 if the path and/or paths have changed. At step 1104, the server communicator 106 on the network-server handles the request using an application interface (API) such as the Win32, or Linux APIs that calls the servlet which monitors the path or paths for any changes per step 1106. Any timeout deadline may be set. In an embodiment a timeout deadline of 15 seconds is set. When the API times out step 1108 is taken and a an indicator will be returned to the user profile data interface indicating that the path and/or paths did not change, such as FALSE, but any other indication may be utilized. If the server communicator 106 notes that the path or paths has changed prior to the timeout deadline, then no timeout will occur. At step 1110 a code will be returned to the User Profile Delivery System front-end code indicating that the path and/or paths did change. The code may be TRUE, but any other code indicator may be utilized. At step 1112 the code will be returned to the user profile data interface for evaluation.

At step 1114 the user profile interface evaluates the code that is sent to it to determine available paths. If the available paths have changed, the user profile interface will notify the system at step 1116 to refresh the user profile data interface on client 4 to accurately reflect and synchronize with server 6 in real time. This loop will continue to be performed until the user profile data interface is destroyed or closed.

Figure 12:
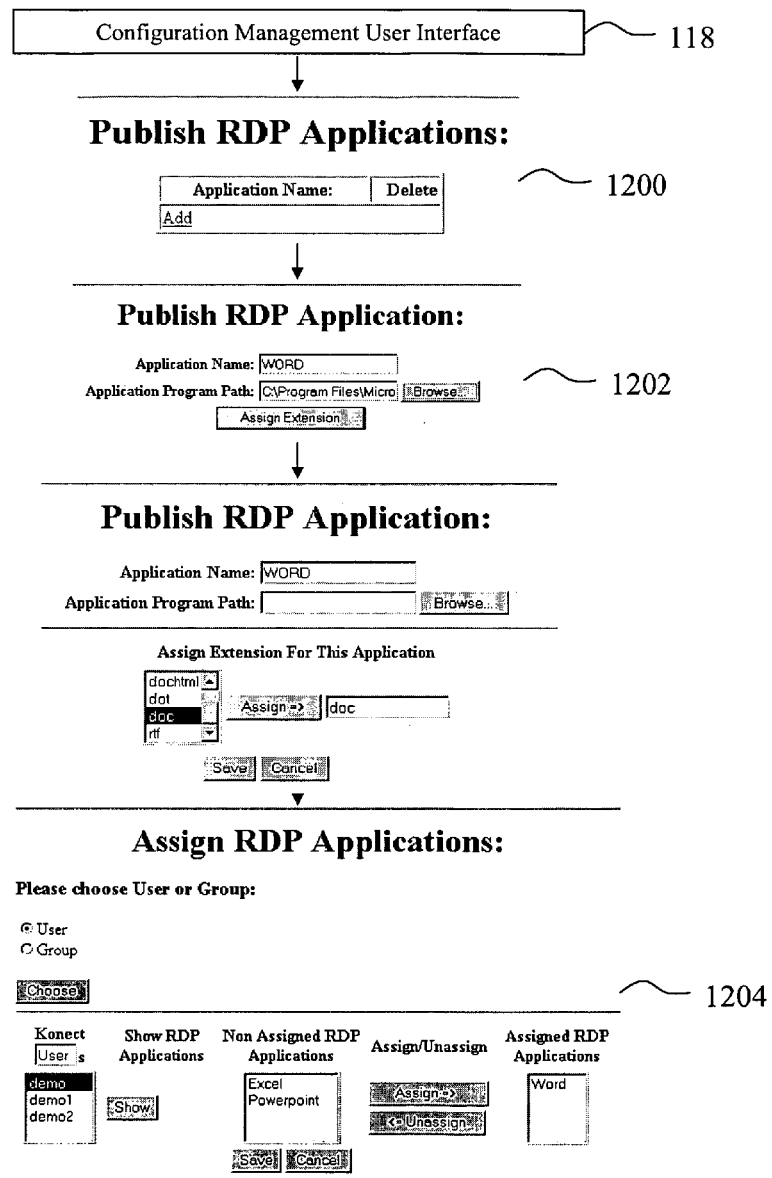
FIG. 12 illustrates exemplary GUIs for a publication and distribution function performed by the network system of FIG. 1B.

Referring to FIG. 12, for applications stored on server 6 which may be accessed by clients 4, a management process is provided to control and manage publication and distribution of these server-based applications. Management allows a system administrator to assign specific hosted server based applications to a specific user and/or user groups via configuration management user interface of the system. In operation, a series of GUIs are displayed during the execution of the management process. Aspects of selected GUIs are described in turn.

The ability to publish and distribute hosted server based applications can be configured using the configuration management user interface 118 of the system. To publish server based hosted application, GUI 1200 is produced and the user selects "add", application name from one of the many views available from the configuration management user interface. Then in GUI 1202 the user would type in any user-defined name for the hosted server based application, and its program path. For example, to launch a Microsoft Office word application, the application name could be "MS Word" or "Word", and the application path could be "C:\Program Files\Microsoft Office\Office\WVNWORD.exe". Once the application name and path have been defined, the management console may then use a Microsoft server API to retrieve the associated extensions relative to the published application by selecting the assign extensions. Once extensions are retrieved, the server based hosted application being published may require that a default extension is assigned from the retrieved extension list to complete the publishing of that application. The published application is then written to database 116d. Once published, the server based hosted application can now be distributed by the configuration management user interface to multi profile users using selections shown in GUI 1204. The system may distribute applications using Microsoft's Active Directory (AD) users and user groups. From the management console, published applications may dynamically be distributed to existing Active Directory (AD) users or user groups. Each user or user group may have access to different published applications as defined by the configuration management user interface of the system. Once the published server based hosted applications have been distributed, the setting are then saved back to the database 116d of the user profile data within the system.

Figure 14:
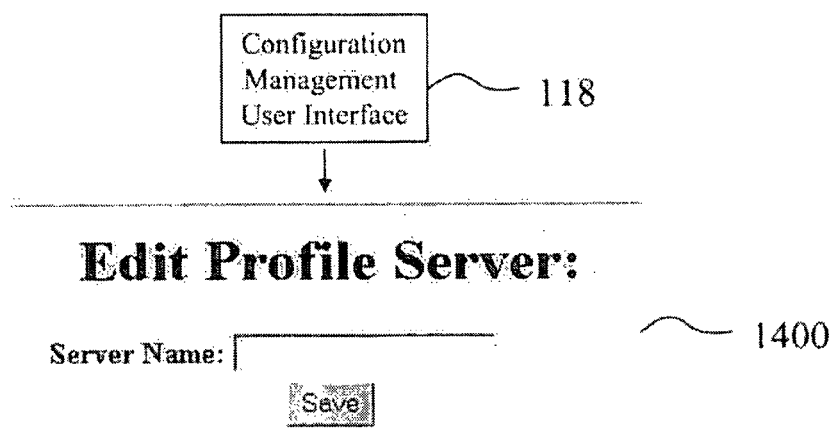
FIG. 14 is a diagram showing an exemplary GUIs for profile synchronization performed by the network system of FIG. 1B.

Referring now to FIG. 14, as part of the real-time management of resources, the embodiment tracks and synchronizes access to files amongst clients 4 and server 6. File synchronization is a recursive process to copy files from a primary profile source to a target and back to primary profile source, using a best-case algorithm (copy all, newest file wins) in order to minimize file copying over the network. It operates by examining and pulling both the primary profile file server source directory and the destination directory and copying files to the target. Preferably it does not delete files that have been deleted on the source, as this could possibly cause loss of data. Following the two instances below, files are then restored/copied back to the primary profile server. The profile server can be set using the configuration management user interface 18. As shown in GUI 1400, to edit a profile server, a user would type in the primary profile server name and hit the save button. The primary profile server name is then saved in the server registry 116c.

File synchronization occurs at a connection instance and at the start or completion of an server based application. At connection and disconnection to the back end interface 10B, a user pulls files from a profile server or other profile sources and allows other users to interact with server files from their client 4 via the user profile data interface. Again, an interface may comprise of one or more interfaces such as a desktop launcher, server desktop, or client 4. When the system AppRunner process starts, its properties file can optionally contain information where to pull/restore files from primary profile file server source directory and the destination directory and copying files to the target before and after the Terminal Services server application runs. The AppRunner is a server-side program, which launches the server based application that the user selected, along with ensuring the user is logged out at the end of the session.

Figure 15:
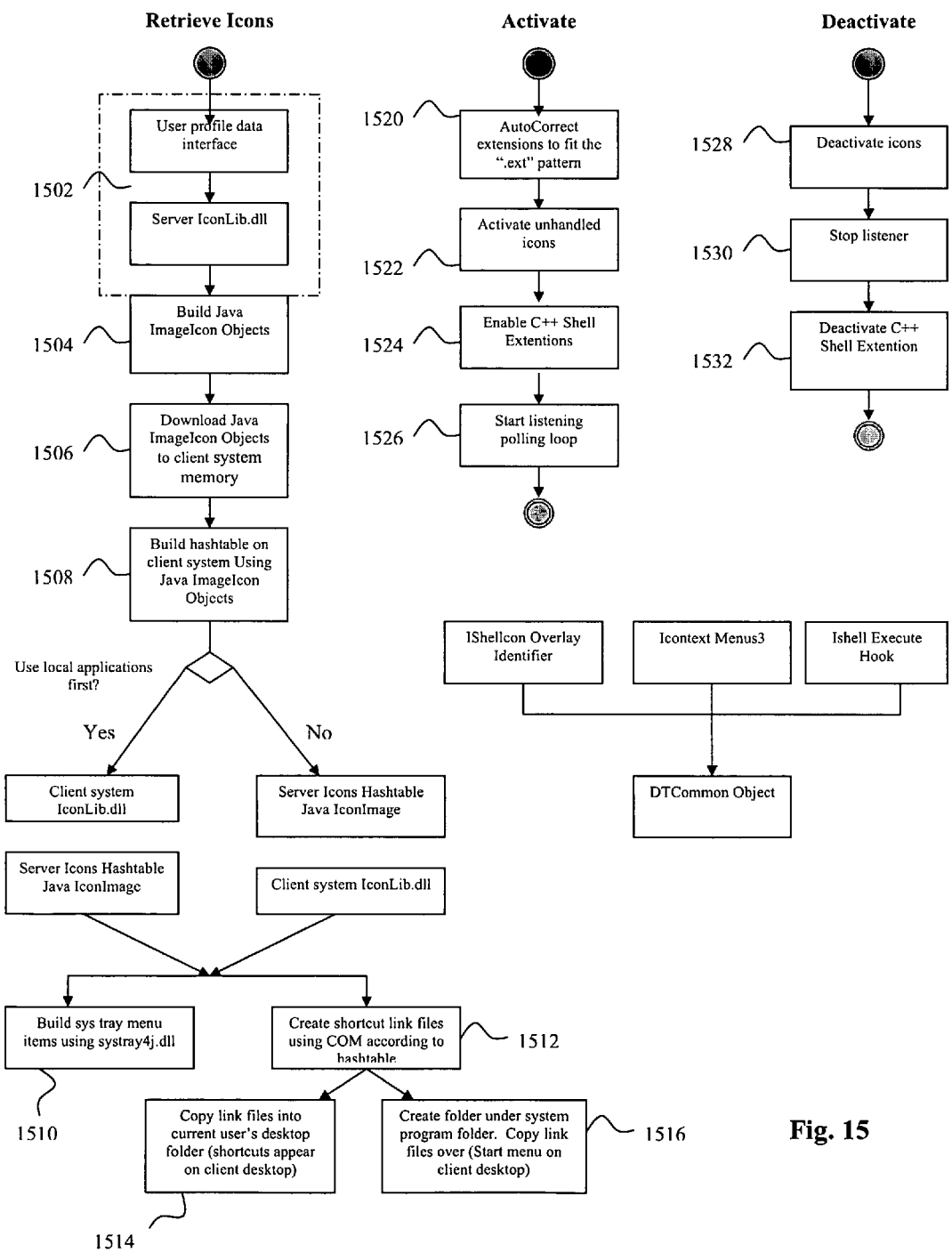
FIG. 15 is a flow diagram of the rules and operations performed on icon integration process performed by the network system of FIG. 1B.

Referring now to FIG. 15, as noted earlier, a feature of the embodiment is the ability to access a client 4, and take an inventory of applications (and/or services) stored on server 6 as well as applications (and/or services) stored on client 4.

Applications can be initially sought from server 6 and then from client 4 or vice versa. When the user activates the client interface on the client 4, shortcuts and icons may be dynamically created and displayed into any one or more of the client interface special areas including and not limited to start menu, desktop icons, and the system tray on the client 4. Also applications, their icons and their file/data type associations can be registered. From the inventory of identified applications, information on associations and locations between applications and both files and data can be made. Using this information, preferably, an initialization step operating on client 4 identifies available shortcuts to applications and associations between: (i) files and both applications and services; and (ii) data and both applications and services. The displayed applications may provide shortcuts and the correct file (or data) to application icon associations and a unique notation may optionally display as icons on the client 4. The icons may be presented: (i) In a special area in the GUI on the display of client 4; (ii) as desktop icons on client 4; (iii) as a icon in any activation bars or launcher on the GUI on the display of client 4. Also, during initialization applications and their correct file (or data) type associations are registered on client 4. Registration facilitates correct association, generation and display of associations of icon to applications on client 4.

An aspect of the embodiment is that at client 4 each of applications, data and files may selectively be made to appear that they are installed on client 4, when one or more of such items may be installed on server 6. Icon shortcuts, associations between files and both applications and services and associations between data and both applications and services provide access for client 4 to remote applications running on server 6. Applications and services may include and are not limited elements and resources on client, server, and web based applications and services.

Nevertheless, as part of the implementation of this access, the user at client 4 may be kept aware of the ultimate source of an application/service using specific notations, shortcuts, and icons in client interface on the client 4. Registration of applications/services on client 4 system and the correct associations between files and both applications and services and associations between data and both applications and services allows the software to dynamically create shortcuts, icons, and notations to elements and resources on the server 6 to be displayed in client interface on client 4. Registration of applications and services on client 4 may be required for correct icon, file path and file type association of icons, shortcuts and notations, etc. . . . On client 4, system may obtain an inventory of server 6 and client 4 applications/services using a hashtable created on the client 4 internal memory. Applications (and services) on server 6 are registered on a system registry at client 4 and logged there. Status and log changes may be logged and saved into another registry under the user profile on client 4. This is done so that each client 4 can have its own unique profile data interface. The embodiment preferably backs up changes in a system registry and recovers original settings to the client 4 system registry when deactivating an access to server 6. When an application (or service) for a file (or data) is located on client 4, one type of icon for that file is displayed on client 4. Conversely, when the application for a file is located on server 6, a different type of icon for that file may be displayed on client 4. The identification of the appropriate icon to display is managed by the embodiment.

In particular, process flow 1500 for retrieving and displaying server and local client 4 icons on the client 4 is shown. From a user client interface, associations between files and both applications and services and between data and both applications and services on client 4 can be dynamically configured. Icons relating to server-based applications and services may be dynamically retrieved and configured from server 6, in addition to locally installed and configured applications or services. Icons for applications that are obtained from server 6 which client 4 may or may not have installed are encoded into java ImageIcon objects for transport, and then saved as ".ico" files for the client 4 use. Java ImageIcons objects are Java library objects that are used to hold images, which are specifically used as icons inside of a Java application.

At step 1502 when the user profile data interface is activated or launched, the server Iconlib.dll is invoked to retrieve all published hosted server-based applications or services and their associated extensions using the system. The IconLib library handles all the native platform to Java translations for retrieving the icons from the system. These retrieved icons and their extensions are used to build Java ImageIcon objects step 1504 and download the Java ImageIcon objects step 1506 from server 6 to internal memory of client 4 from over link 8. Java ImageIcons are Java library objects that are used to hold images, which are specifically used as icons inside of a Java application. Generally, Java does not allow these ImageIcons to be created from Windows .ICO or .DLL resources. Instead a library for accessing icons from native sources and translated into Java ImageIcons is used, e.g. IconLib.dll. It will be appreciated that other method types and translation methods for retrieving and translating icons for applications and services for multiple operating systems made be used, including using native source code without translation.

The Java ImageIcon objects are used to build hash table step 1508 on client 4. The hash table contains the relationships between the file extension (i.e. ".txt") and the actual image. The client interface on client 4 generates icon files on the client with images stored in the hash table. The embodiment may be set by default to use local or server applications first. If the software uses local client 4 application/services first, the Iconlib.dll is invoked to retrieve local applications and their associated extensions and then compare to server icons in client 4 internal memory, to accurately populate the user client interface on the client 4. If the embodiment uses server applications first, the server icons in client 4 memory are compared to the Iconlib.dll of local client 4 retrieved applications and their associated extensions and are then used to accurately populate the client interface on the client 4. The user profile data contains graphics for the icons, file type extensions, and the path to access and execute the application, service or associated file/data. Both server 6 and local client 4 applications and their associated icons are then utilized by the system shell extension, which is activated when the user is logging into client 4. The shell extension can be used to add functionality (e.g. icon overlays, icon notations, applications and services associations, associations among any of files, data, applications and services document activation, and Context Menu activation) to the Microsoft Windows Shell (Explorer).

At step 1510 the client interface builds any icons and associations into any activation icons/bars (e.g. a sys tray in Microsoft Windows™) into client 4 and makes necessary associations to any applications, services, icons and user controls using the systray4.dll. At step 1512 the client interface creates shortcut link files to server-based applications or services and icons to any associated icon to file association, such as data relating to COM matters as provided in the hash table. At step 1514 the shortcut links are dynamically copied into the user's desktop folder so that they appear on the client interface on the client 4. At step 1516 the client interface can dynamically create a folder (which may be labeled as a remote applications folder) through another special area in the user's client interface (for example, in a start menu in Microsoft Windows) under a system program folder and can dynamically copy shortcut links associated with applications and services into this folder. A user at client 4 may see that the following elements are locally installed on client 4: applications and services in the sys tray, start menu entries, shortcut links, and icon associations between files and both applications and services and between data and both applications and services. From a user's perspective, the applications in the system tray, starts menu entries, desktop shortcut links and associations among files/data to application appear as if they were installed on client 4. This appears as if the application was installed on their client 4 machine, although it is actually a shortcut or icon with or without unique notation to a remote seamless application/service and/or file/data-to-application/service running on server 6.

The shell extension may be comprised of two sides: a user profile data interface side (example: Java Side); and a client side (example: C++ Side). As such, file name extensions on client 4 can be registered in a registry (such as a Windows registry) as if associated applications have been installed on client 4. As registered item typically only include an icon path of the extension icon file, execution of the item may typically be processed by the shell extension IShellExecuteHook COM component. The user profile data interface side handles activation and deactivation of a C++ shell extension and registration of icons for un-handled extensions. Unhandled extensions on the client 4 may be registered in the windows registry. The unhandled registry items under the extensions may include the icon images, icon path, and file type extensions that may be processed by the shell extension IshellExecuteHook COM component. Unhandled extensions are icons that do not fit the ".ext" pattern on server 6 and/or client 4. For unhandled extensions, upon activation of the shell extension at step 1520, the shell extension first adjusts the extensions to fit the ".ext" pattern. It is also preferably that the sizes of icons at client 4 be matched with an appropriately sized icon for the corresponding application at server 6. The hashtable may include extension icons in a format that does not match the required format extensions to fit the ".ext" pattern on the client 4 system. For example, hashtable may have icon extension in a format such as "[ext16:[icon16×16] ext32[icon[32×32]". This format may not match the required format in extension pattern on client 4 which is "[ext: [icon16×16][icon32×32]". As such, an adjustment should be made. At step 1522 the shell extension uses icons passed from server 6 to give icons to file patterns which may or may not have local icons at client 4 and may override icons for applications that have local icon, when a client selects a "server first" for application execution. For example, if Microsoft Excel is installed on local client 4 and is also available from the server 6 as a hosted application, the embodiment may override using the icons on client 4 to use the Excel application icon on server 6. The embodiment may also dynamically display any associated Excel files on client 4 with the correct icon from server 6 to launch the application or associated file using Excel installed on server 6. See for example, icon 2012 (FIG. 21). The icon images in the hashtable are transferred into ".ico" files using the iconlib.dll on client 4, and saved into a temporary folder on client 4 so that it can be accessed later. Thereafter, each file extension in the hashtable can be checked against the windows registry. If the file extension is already registered, the embodiment can overwrite the default icon with the newly generated ICO file. If the file extension is not registered, the embodiment can create a new extension and populate the default icon location. All these changes may be logged and saved into another registry entry, such as \\HK_CURRENT_USER\Software\DesktopSites\Icons.

This step allows the embodiment to backup changes in the registry in client 4 to original settings when the icon logic of the embodiment is deactivated. The backup information is also useful for tracking histories during other functions such as logoffs, fatal error recoveries, etc. The registry changes preferably are based on each user activating the embodiment on client 4 not system changes. This allows multiple users on a given client 4 to have their own unique registry settings.

The C++ shell extensions are then enabled in step 1524 by storing the Shell Extension activation status in the Microsoft Windows Registry, such as \\HK_CURRENT_USER\Software\DesktopSites\Shell Extension. Once the Shell Extension has been activated, all activations of applications and services are intercepted and logged into the same registry entry. The C++ shell extension may provide this interception, because it implemented the IShellExecuteHook Interface, as such all shell commands issued through windows may be filtered by C++ Shell Extension. Client 4 then starts listening and polling at step 1526 for any changes or updates to files/data and their associated extensions on client 4 so that they may be accurately reflected on the client interface of client 4. Upon a deactivation process, at step 1528 when the user logs out of his user profile data interface on client 4, all changes to local icons on client 4 are restored. The listener stops listening and polling at step 1530 and the C++ shell extension is then deactivated at step 1532. When the deactivation status of applications are stored into the registry entry, the C++ Shell Extension may not need to filter the shell commands.

The C++ side handles integration with the user profile data interface on client 4. It does this by implementing interfaces provided by 3 Comm, e.g. IShellExecuteHook which is used to capture document activation events; IContextMenu3 which is used to add entries to the document's context menu; and ShellIconOverlayIdentifier, which is used to overlay icons on top of Icons defined by the system and pass control to a common object. At 1520, common object handles activation and deactivation, icon display logic, identifying existence of a handler for an application when an object is in client first mode and communicating via a message key to the Java side.

It is useful to note the Shell Extension is a set of stateless objects, as they store all of the current activation information in the Microsoft Windows Registry. This allows multiple Windows Shell processes to start, and share the activation information, even though that specific instance of the Windows Shell was not activated.

Figure 16:
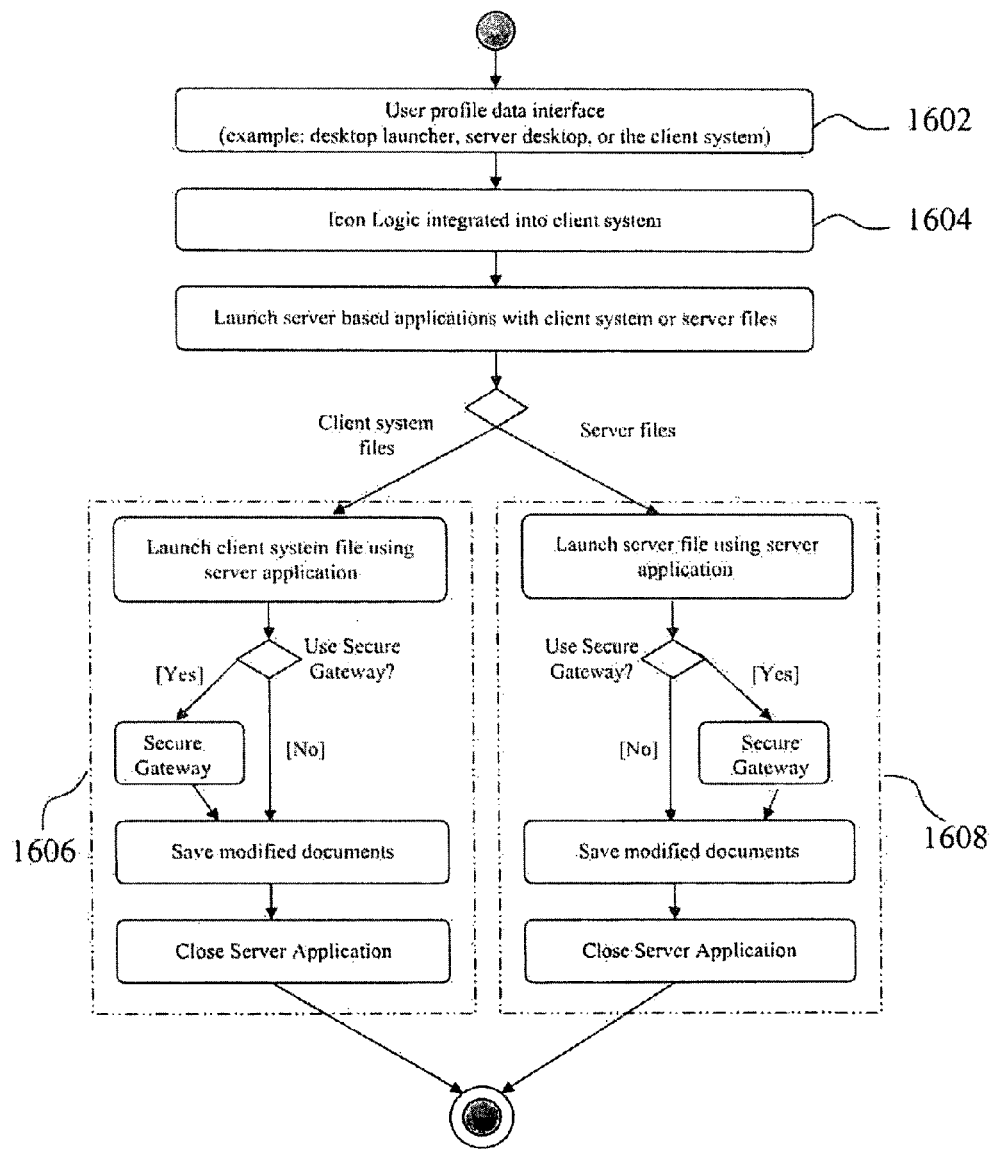
FIG. 16 is a flow diagram of host-based application launch process performed by the network system of FIG. 1B.

Referring now to FIG. 16, a process for launching a hosted server based application is shown at 1600. From a user client interface, the user can seamlessly launch a hosted server based application using a local or server based file from client 4. Launching server 6 application/service on the client interface on the client 4 will appear in a seamless windows environment just like a locally installed application on the client 4. From the user's perspective the application/service on server 6 appears as if it was installed on client 4. To achieve this transparency, the server software may maximize the RDP window on client 4 and the outside window may be made to be frameless and transparent by color value. As such, the software will have a same color as the desktop background color of the application or service of server 6. As such, the RDP window is transparent to the user and only the application windows are visible. This allows the published applications to appear to run seamlessly on client 4 within a seamless windows environment. It will be appreciated that in other embodiments other techniques and systems may be used to launch applications, using techniques and systems known in the art.

To launch a hosted server 6 based application at step 1602 user's profile data interface is activated using the system. The process for icon logic at step 1604 will dynamically populate the user's profile data interface, so that hosted server based applications in association with local and server files on client 4 are tagged with the appropriate icon logic. The files are tagged with a unique icon label overlay to signify to the user that launching that specific file will be accomplished using a hosted server based application. Both local and server files can be launched from the local client 4 using the system. Local files are defined as files available on client 4 hard drives. Server files are files on a server not located on client 4's local hard drives.

When launching a local client 4 file using a hosted server based application, path 1606 is taken and port knocking or secure gateway may or may not be utilized depending on settings set in configuration management user interface 118 turning port knocking or secure gateway on or off. For remote access the port knocking or secure gateway is generally turned on. For local LAN access the secure gateway is generally turned off. If the secure gateway is on, all application data will run through port 80 or port 443 eliminating the need to open unnecessary ports. If the secure gateway is off, port 80 and port 3389 may be required to be open to run the hosted server based application on the local LAN. If port knocking is turned on, then depending on the combination sequence sent by the client from the server for that instance of launching a server based application will perform the knock and open the port within a defined start and stop port range defined by the configuration management user interface. Each new instance from the client to server to launch a server based application will have its own combination sequence to open the port. Saving any edits or modifications to the document can be achieved in the same manner as launching a local application. Closing or exiting a hosted server based application can be achieved in the same manner as closing or exiting a local application.

When launching a server file using a hosted server based application path 1608 is taken and port knocking or secure gateway may or may not be utilized depending on settings set in configuration management user interface turning secure gateway on or off. For remote access the port knocking or secure gateway is generally turned on. For local LAN access the secure gateway is generally turned off. If the secure gateway is on, all application data will run through port 80 or port 443 eliminating the need to open unnecessary ports. If the secure gateway is through port 80, then port 3389 may be required to be open to run the hosted server based application on the local LAN. If port knocking is turned on, then depending on the combination sequence sent by client 4 from server 6 for that instance of launching a server based application will perform the knock and open the port within a defined start and stop port range defined by the configuration management user interface. Each new instance from the client to server to launch a server based application will have it's own combination sequence to open the port. Saving any edits or modifications to the document can be achieved in the same manner as launching a local application. Closing or exiting a hosted server based application can be achieved in the same manner as closing or exiting a local application.

In other embodiments on a Solaris, Unix or Linux client, the client side of the application runs may be implemented in a similar fashion. However, provisions may need to be made for drive shares and implementations of Terminal Services. In particular, the drive shares may not be not mapped via WebDAV to the client. Instead the drive shares may use a NFS. Also, the client may not use a Microsoft implementation of the Terminal Services Remote Desktop Client. Instead it may use a RDesktop client as a library.

Turning now to aspects of activation of application and files, a description is provided first on a process for activating a local application for client 4 for a file stored on server 6.

Figure 17:
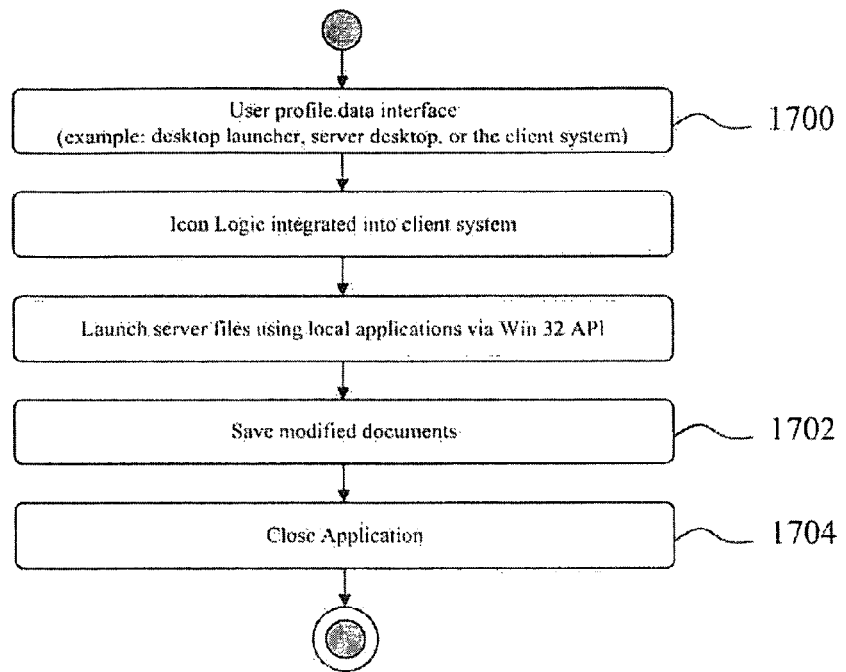
FIG. 17 is a flow diagram of local application launch process performed by the network system of FIG. 1B.

As such, referring now to FIG. 17, a process for launching a local application with server based files is shown. From a user profile data interface, the user can launch a local client 4 application using a server-based file similar to a LAN environment. Launching a local application with a server-based file is initiated at step 1700 from the user's profile data interface (one or more or a multitude of interfaces such as a desktop launcher, server desktop, or client 4) using the system. The icon logic module (FIG. 15) of the system dynamically populates the user's profile data interface, so that server files may use local applications on client 4. The icon logic for server files on client 4 is populated with the same icon label association as the files on the local client 4. For example, a Word file is labeled with a Word icon. Launching a server file with a local client 4 application may be achieved using a Microsoft Win 32 API similar to a LAN environment. A standard method of opening a server file, with a local client 4 application functions just like on a LAN environment. At step 1702 saving any edits or modifications to the document is performed in the same manner as launching a server file with a local client 4 application on the LAN environment. At step 1704 closing or exiting a document is performed in the same manner as closing or exiting a server file with a local client 4 application on the LAN environment.

Now, further detail is provided on selected interface and administrative functions of the embodiment.

Figure 18:
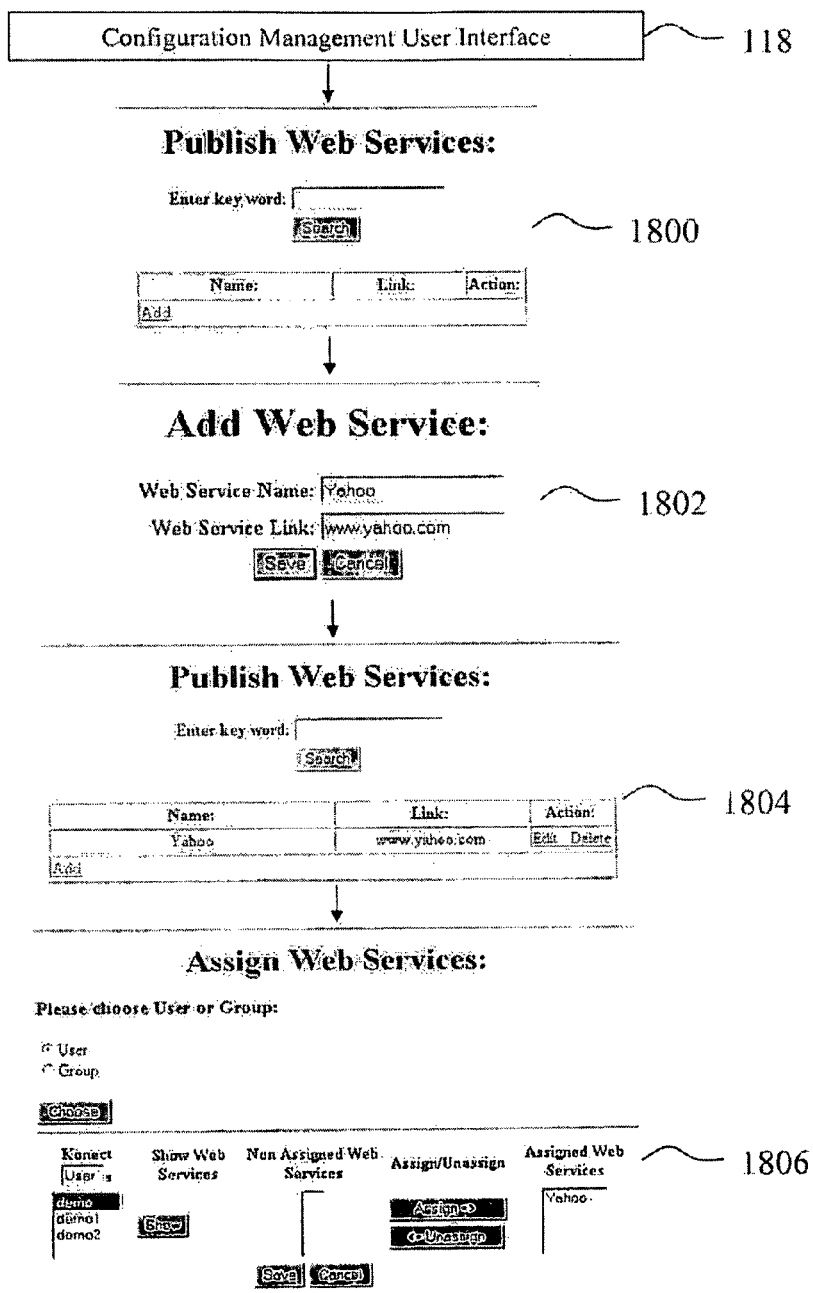
FIG. 18 illustrates exemplary GUIs for a publishing service processes performed by the network system of FIG. 1B.

Referring to FIG. 18, a management process is provided to control a user's access to web applications and services. In the course of execution of the management process, a series of GUIs are selected provided to the system administrator to assist in navigating through the process. The GUIs provide an interface for the administrator to assign specific web applications and services to a specific user and/or user groups via the configuration management user interface of the system.

In particular, publication and distribution of web applications and services are configured using the configuration management user interface 118 of the system. In GUI 1800 to publish web applications and services, a user selects "add" to add a web application or service name from one of the many views available from the configuration management user interface. Next in GUI 1802, the user enters any user defined name of the web application or services, and its URL location path. For example, if you are launching a Yahoo, the web application name could be "Yahoo", and the application path could be "http://www.yahoo.com". Once the web application or services name and path have been defined, selecting "save" in GUI 1804 writes the data to the database 116*d*. Once published, the web application or service can now be distributed by the configuration management user interface to multi profile users. GUI 1806 provides the user with the interface to control this distribution. The system may distribute web applications or services using Microsoft's Active Directory (AD) users and user groups. From the management console, published web applications or services may dynamically be distributed to existing Active Directory (AD) users or user groups. Each user or user group may have access to different published web application or services as defined by the configuration management user interface of the system. Once the published server based hosted applications have been distributed, the setting are then saved back to the database 116d of the user profile data within the system. To delete a web application or service, the user would select "delete" from the GUI 1804 to confirm action.

Figure 19:
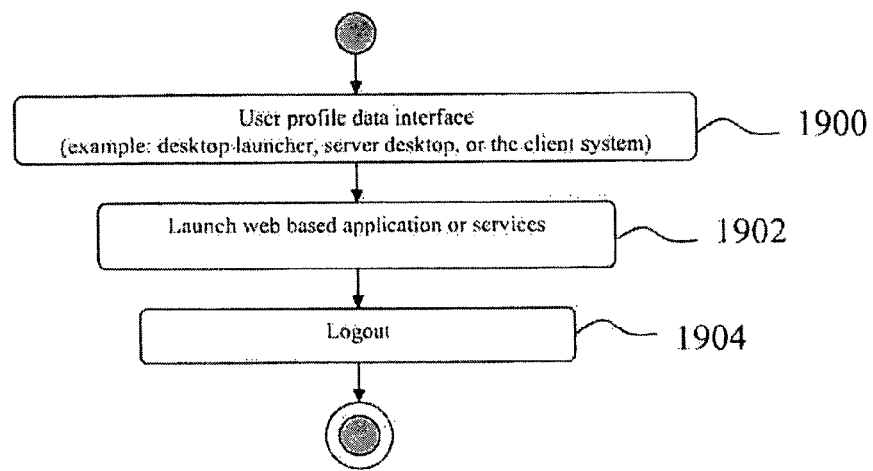
FIG. 19 is a flow diagram of a web based application launch process performed by the network system of FIG. 1B.

Referring to FIG. 19, once configurations of web applications and services are complete, each application and service is available for launching. To launch a web application or service, a series of GUIs are provided to the administrator to guide him through the process. From the user profile data interface the user may select a web application or service by activation of the appropriate selection.

During login process 290 (FIG. 2), the system gets, loads and integrates the user's profile information into the user profile data interface on the client 4. A user may launch 1902 the web application or service by one of two methods. In the first method the user clicks on an icon image object shown on client 4 to launch the specific web service or application. In the second method the user launches the specific web service or application from the user profile data interface on the client from a pull down tab. Both methods will send a get web application URL string to the server 6. The system will capture the user profile data interface content and open a new web browser window to display the web application or service. To logout of the web application or service, simply close the browser window or selecting logout from the pull down tab of the desktop launcher.

Figure 20:
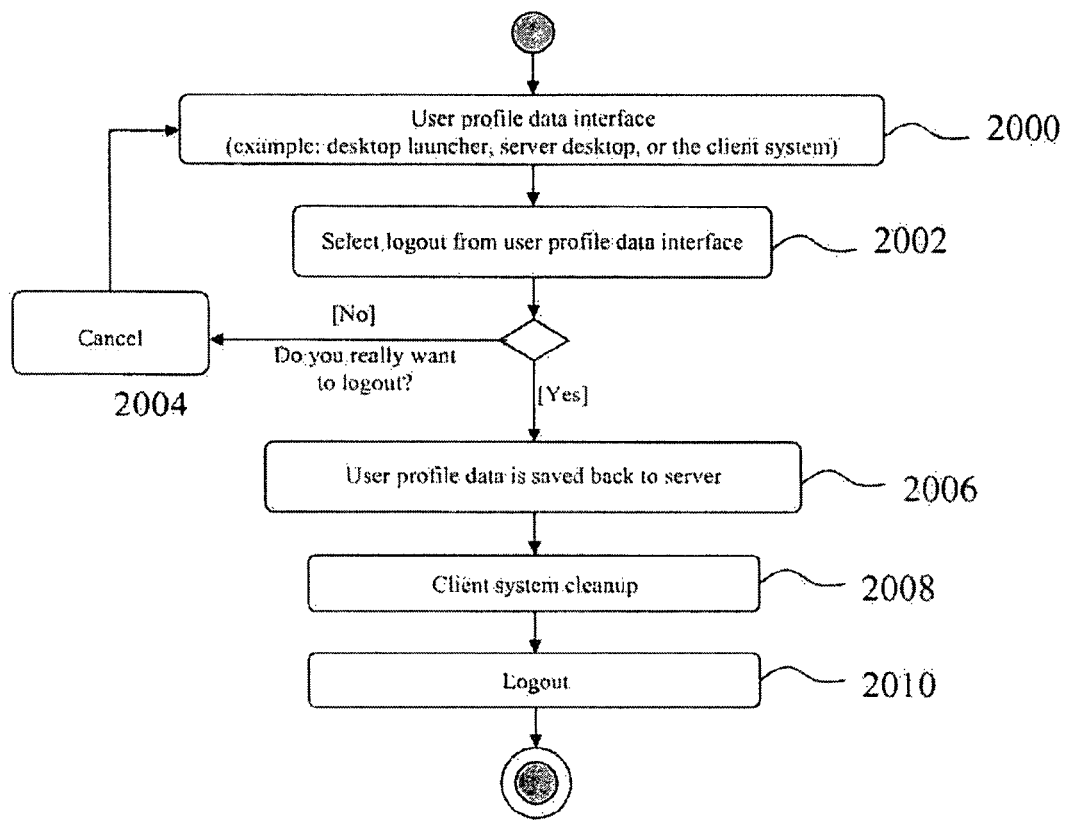
FIG. 20 is a flow diagram of a logout process performed by the network system of FIG. 1B.

Referring to FIG. 20, a procedure to logout of the system is shown. To logout of the system, the user simply closes the user profile data interface (which could be one or more, or a multitude of interfaces such as a desktop launcher, server desktop, or client 4) by clicking on the x or from the pull down tab selecting logout. A dialog box will prompt the user "Do you really want to logout?" if the user selects cancel, the logout command will be aborted and the user will remain logged into their user profile data interface. If the user selects "yes", the user's data profile will be saved back at the server via the server communicator. All user profile data and virtual drive mapping on client 4 will be removed and deleted. The user will then be transparently logged out from both client 4 and the server.

Figure 8B:
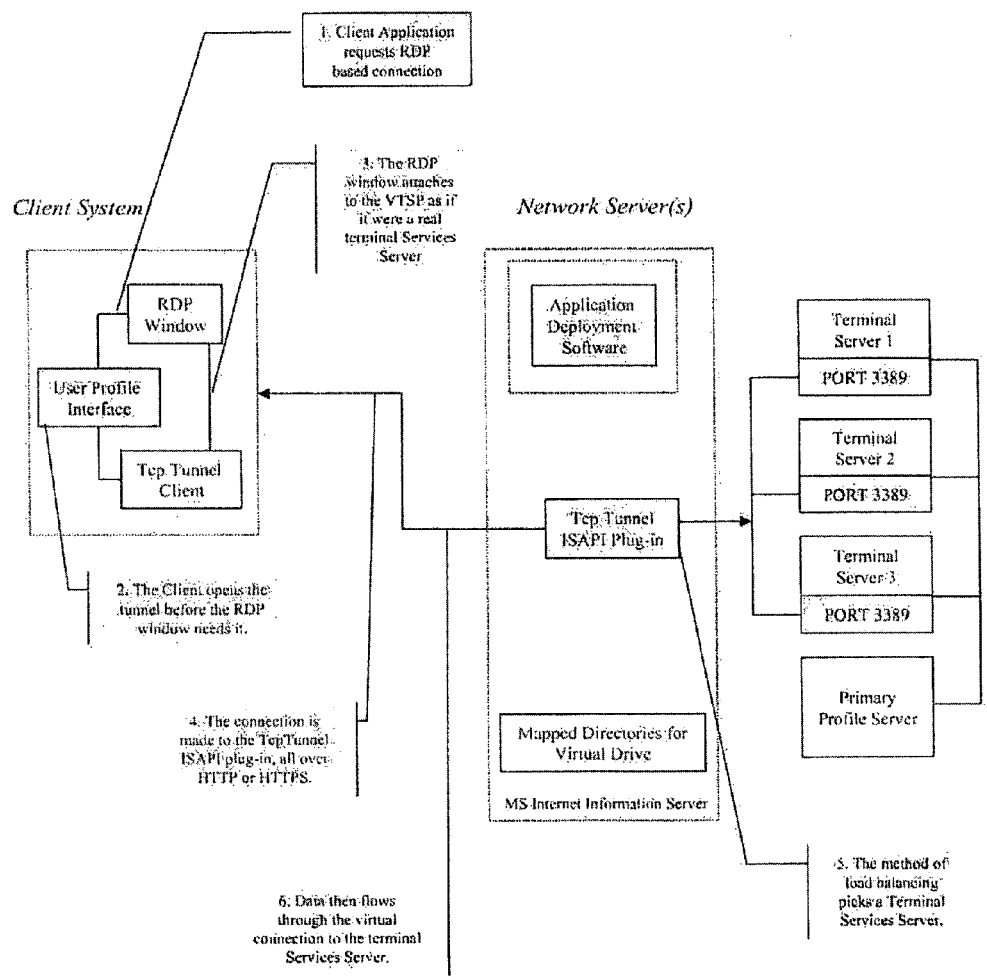
FIG. 8B is a network diagram showing data rules, setup, and operations performed by a gateway operation for the network system of FIG. 1B.

Turning back to load balancing and FIG. 8b, load balancing is invoked when the client requests a hosted server based application and the server side is aware of the existence of multiple networked terminal services server IP's in the server registry data, as defined by the configuration management user interface. Load balancing is also defined in the configuration management user interface 118 to execute a specific method of load balancing. Load balancing methods such a CPU load monitoring, round robin balancing, per user, per server count and random balancing may be used. To add terminal server from GUI 1300, a user selects the "add" button and enters the server name and the Port to utilize terminal services shown in GUI 1302. Selecting "save" saves the inputted server data to the server registry 116c, which is utilized by the user's profile data. To remove networked terminal services server, GUI 1304 is displayed and the user selects "delete" and confirms the server to be deleted in GUI 1306.

Back end interface 10B performs several steps to connect the Windows Terminal Services client (RDPWindow) to the Window Terminal Services Server. When the client requires a connection, the system opens a tunneled HTTP/HTTPS connection to the server, which communicates to the ISAPI (Information Server API) plugin over HTTP (or HTTPS). This creates the Virtual Terminal Services Port (VTSP) on the client machine. Next, the RDPWindow attaches to the VTSP which, in turn begins communicating across the HTTP(or HTTPS) connection to the ISAPI plugin. When the first actual data reaches the ISAPI plugin, it selects a Windows Terminal Services server to connect to, and associates the VTSP with that actual Terminal Server. The selection process is a simple, round-robin selection.

Figure 13:
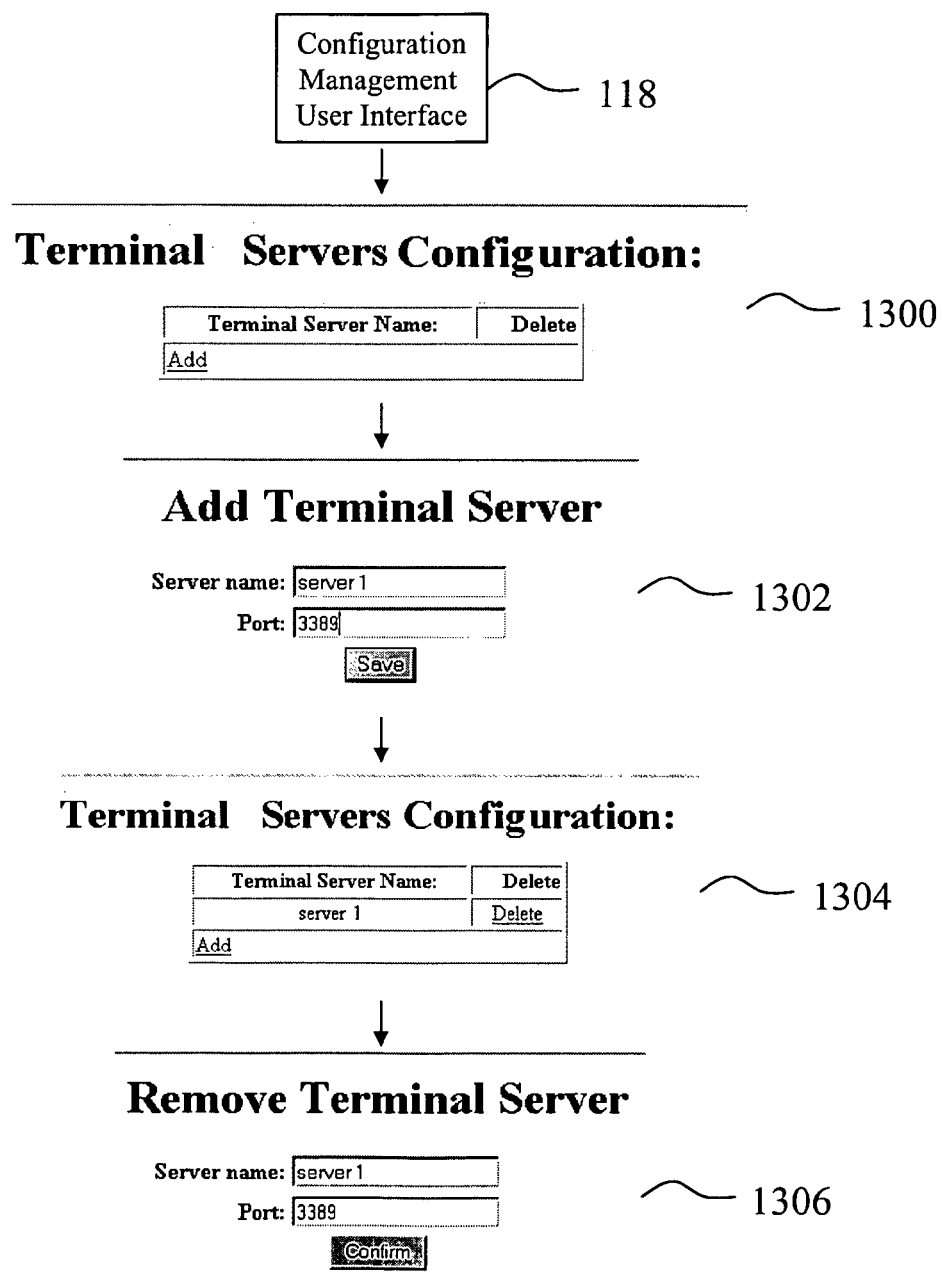
FIG. 13 illustrates exemplary GUIs for a load balancing function performed by the network system of FIG. 1B.

Referring to FIG. 13, a series of GUIs for the load-balancing module are shown. The load-balancing module of the system dynamically controls user requests to launch hosted server based applications on one or more network terminal services server. Load balancing occurs when more than one terminal services server is used within a domain. Load balancing is a feature more suited to environments having more than one networked server 6. Servers 6 may be added or removed via one of many views using the configuration management user interface 118.

Figure 22:
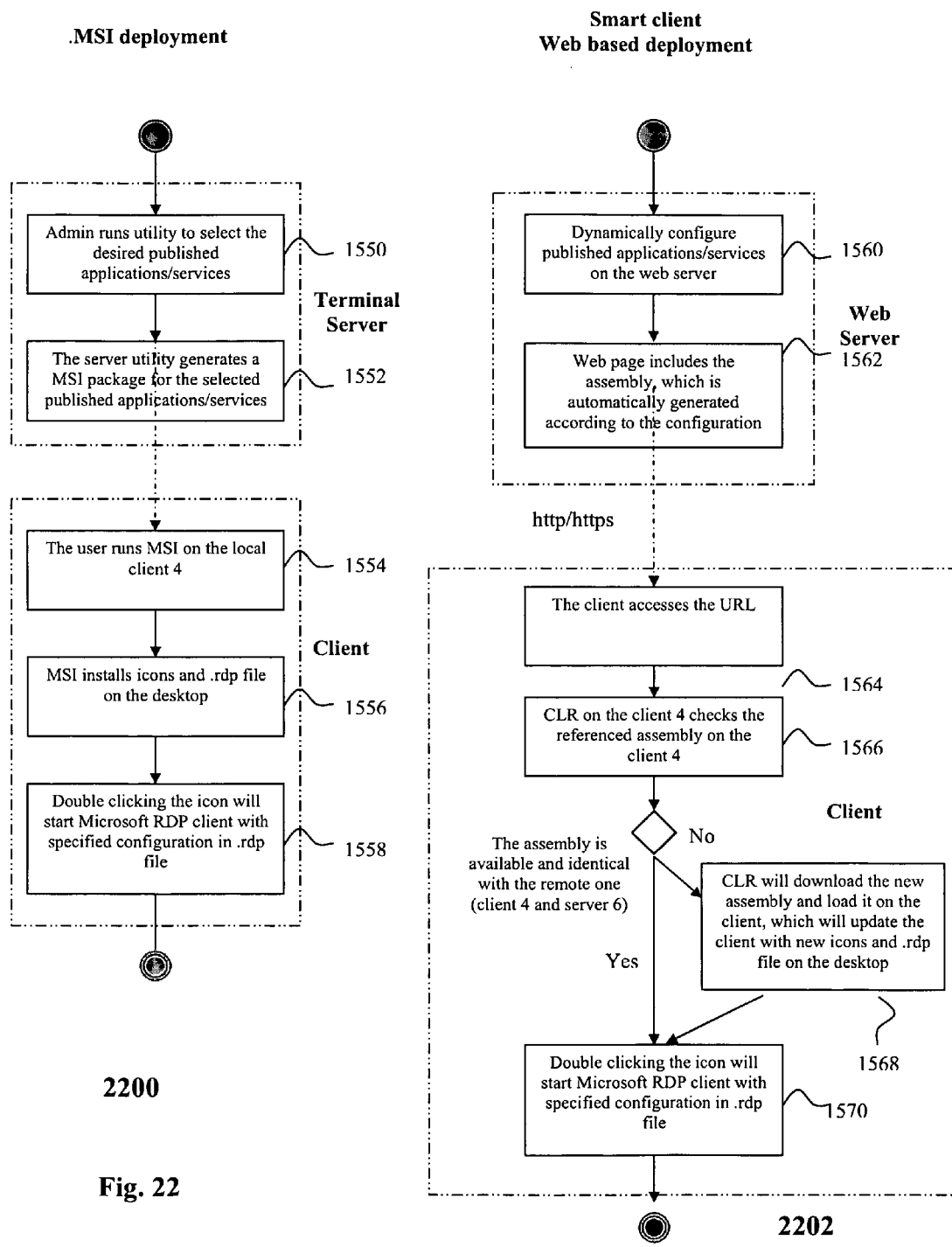
FIG. 22 contains flow diagrams of alternative network systems of the network system of FIG. 1B.

Referring to FIG. 22, flow charts for two installations of an embodiment are provided for a Microsoft-based™ installation. In flow chart 2200, the embodiment may provide multiple processes to deliver applications from server 6 to client 4. First, at step 1550 an embodiment may require an administrator to select the desired resources from server 6 to be published (e.g. files, data, applications, and services). Then at step 1552, an server 6 generates an MSI (Microsoft Windows Installer) package for the selected resources. The MSI package is then downloaded from server 6 to client 4 via a link 8. At step 1554, user at client 4 initiates the MSI package. Execution of the MSI package at step 1556 causes the installation of the published resources on client 4. Installation includes registration of the icons and file type associations of the application on client 4. These icons and shortcuts may appear in a dedicated area of the GUI on client 4, such as a system tray, start menu, desktop shortcuts, and/or activation bar.

In flow chart 2202, a web-based deployment of an embodiment may be provided. Therein, at step 1560 an administrator may use the embodiment to dynamically configure and publish the desired resources from server 6 to a separate web server (not shown). At step 1562, a web page in the embodiment may provide an assembly for the resource, which is automatically generated according to the configuration of the resource at sever 6. At step 1564, a user at client 4 may access the configured web page via link 8 from a specified URL. At step 1566, a Common Language Runtime (CLR) application on client 4 checks the referenced assembly on client 4. If the assembly on client 4 is available and identical to the web-based assembly, then at step 1570, the user can double click the server 6 resource icon on generated at client 4 and launch the selected resource from server 6. The assembly may contain all the logic for icons and shortcuts to server 6 resources as mentioned above. The resources will appear to the user to be installed on the client 4. In fact, the resources are located on server 6 and only shortcuts and icons are provided on client 4 for those resources. If the assembly on client 4 is different than the assembly on server 6, then at step 1568, the CLR will download the new assembly from server 6 and load it on client 4. The assembly on client 4 be updated with the information of the updated resource on server 6.

Although the invention has been described with reference to certain specific embodiments, various modifications thereof will be apparent to those skilled in the art without departing from the scope of the invention as outlined in the claims appended hereto.

We claim:

1. An access system providing access for clients in a computer network to resources stored in said network, said system comprising:

an instance of a file stored in at least one of a server and a client in said network;

an instance of an application that uses said file, said application operating on said client and said server;

an authentication module in said client providing instructions to a microprocessor in said client operating to provide access to a directory structure stored on a server in said network using Active Directory (AD) protocols to authenticate said client with said server;

an access module in said client providing instructions to said microprocessor in said client to provide said client with communication access to said server and to provide secure access using a secure gateway tunnel to said application that uses said file using Remote Desktop Protocol (RDP) commands;

a first module in said client providing instructions to said microprocessor in said client to generate a first icon associated with said file and a second icon associated with said application in a graphical user interface (GUI) on said client; and a second module in said client providing instructions to said microprocessor in said client to monitor for activation of said first icon at said client;

to initiate execution of said application either on said client or said server for said client depending on whether said application is to be accessed on said client first or said server first and to cause said application to access said file through either said client or said server depending on whether said file is to be accessed on either said client first or said server first;

to update a registry containing activation information on said application, said registry being accessible by other processes operating on devices in said network;

and to initiate an access of said application on said client after attempting to access said application on said server, if said server is not accessible, wherein said client provides a terminal-based environment for accessing said application that uses said file in the network through said RDP commands.

2. The access system as claimed in claim 1, wherein:
when said file is stored on said server, said first icon is provided with visual attributes indicating that said file is located on said server; and
when said file resides on said client, said first icon indicates that said file resides on said client.

3. The access system as claimed in claim 1, further comprising a configuration management interface accessing user profile data defining logical data interfaces relating to said file, said application and a relationship between said file and said application, said user data providing privilege and sharing rights for said file and said application.

4. The access system as claimed in claim 3, further comprising a virtual drive map of files relating to said file on said client, said drive map utilizing said user profile data and providing access to said file from said server to said client and from said client to said server.

5. The access system as claimed in claim 3, further comprising: a mapping of icon files and application files resident relating to said first and second icons is provided to said client, wherein icons relating to said icon files are generated in said GUI on said client.

6. The access system as claimed in claim 4, wherein when said application is activated through said server, said server presents a GUI window on said client relating to activation of said application that is frameless and has a transparent background to provide a seamless graphical user interface environment at said client.

7. The access system as claimed in claim 5, wherein said icons are generated in a dedicated start application area or a system tray area in said GUI.

8. The access system as claimed in claim 1, further comprising a third module to synchronize instances of said file between said client and said server, said third module synchronizing said file at any of when said application on said server is accessed, after access to said application on said server is completed or after said client is authenticated.

9. A method for presenting information to a client in a network where resources are stored in at least said client or a server in said network, said network having an instance of a file in at least one of said server and said client and said network having an instance of an application that uses file in at least one of said server and said client, said network providing said client with access to said server using Active Directory (AD) protocols, said network providing secure access to said application for said client using a Remote Desktop Protocol (RDP), said method comprising:

providing instructions for execution on a microprocessor in said client to generate a first icon associated with said file and a second icon associated with said application in a graphical user interface (GUI) on said client;

providing instructions to said microprocessor in said client to monitor for activation of said first icon at said client;

when a request for said file is initiated on said client, providing instructions for execution on said microprocessor:

to initiate execution of said application either on said client or said server for said client depending on whether said application is to be accessed on said client first or said server first;

to cause said application to access said file through either said client or said server depending on whether said file is to be accessed on either said client first or said server first; and to update a registry containing activation information on said application, said registry being accessible by other processes operating on devices in said network;

utilizing a secure access through a secure gateway tunnel to said application using Remote Desktop Protocol (RDP) commands when accessing said application through said server; and initiating an access of said application on said client after attempting to access said application on said server, when said application is to be initiated on said server first and said server is not accessible, wherein said client provides a terminal-based environment for accessing said application that uses said file in the network through said RDP commands.

10. The method as claimed in claim 9, further comprising providing user profile data relating to a user at said client in said network, said user profile data defining rights and access privileges for said file assigned to said client and said application access by said client.

11. The method as claimed in claim 10, further comprising providing a configuration management interface defining logical data interfaces to said file assigned to said client utilizing user profile data.

12. The method as claimed in claim 11, further comprising providing a virtual drive map of files relating to said file on said client, said drive map utilizing information from said user profile data and providing access of said file from said server to said client and from said client to said server.

13. The method as claimed in claim 12, wherein:
when said file resides on said client, said first icon indicates that said file resides on said client; and when said file resides on said server, said first icon indicates that said file resides on said server.

14. The method as claimed in claim 12, wherein when said file resides on said server, at said client said first icon is configured to present said file to said user as a client-based file through said client.

15. The method as claimed in claim 12, further comprising:

performing load balancing of a gateway tunnel between said client and said server when launching said application from said server, wherein if a secure gateway between said client and said server is activated, application data relating to said application is transmitted through a specific port connecting said client to said server; and if no secure gateway between said client and said server has been activated, an additional port connecting said client to said server is opened if necessary to carry said application data relating to said application.

16. The method as claimed in claim 12, further comprising synchronizing instances of said file between said client and said server at any of when said application on said server is accessed, when access to said application on said server is completed or when said client is authenticated.

* * * * *